(12) United States Patent
Aizaki et al.

(10) Patent No.: US 10,061,185 B2
(45) Date of Patent: Aug. 28, 2018

(54) PROJECTION DISPLAY DEVICE

(71) Applicant: JVC KENWOOD Corporation, Yokohama-shi, Kanagawa (JP)

(72) Inventors: Takatsugu Aizaki, Yokohama (JP); Shinji Kikuma, Yokohama (JP)

(73) Assignee: JVC KENWOOD CORPORATION, Yokohama-shi (JP)

(*) Notice: Subject to any disclaimer, the term of this patent is extended or adjusted under 35 U.S.C. 154(b) by 0 days.

(21) Appl. No.: 15/677,191

(22) Filed: Aug. 15, 2017

(65) Prior Publication Data
US 2018/0059517 A1     Mar. 1, 2018

(30) Foreign Application Priority Data

Sep. 1, 2016  (JP) .................................. 2016-170845

(51) Int. Cl.
| | |
|---|---|
| *G03B 21/00* | (2006.01) |
| *G03B 21/20* | (2006.01) |
| *G02F 1/1335* | (2006.01) |
| *H04N 9/31* | (2006.01) |
| *G03B 33/12* | (2006.01) |
| *G02F 1/1337* | (2006.01) |

(52) U.S. Cl.
CPC ..... *G03B 21/006* (2013.01); *G02F 1/133528* (2013.01); *G02F 1/133553* (2013.01); *G03B 21/2073* (2013.01); *G03B 33/12* (2013.01); *H04N 9/3105* (2013.01); *H04N 9/3167* (2013.01); *G02F 1/1337* (2013.01)

(58) Field of Classification Search
CPC .............. G03B 21/006; G03B 21/2073; G02F 1/133528; H04N 9/3105; H04N 9/3167
USPC ........................................................... 353/20
See application file for complete search history.

(56) References Cited

U.S. PATENT DOCUMENTS

| | | | | |
|---|---|---|---|---|
| 6,893,131 B2* | 5/2005 | Imahase | ............... | H04N 9/3105 348/E9.027 |
| 2005/0073618 A1* | 4/2005 | Hashimoto | ........... | G02F 1/1337 349/5 |

(Continued)

FOREIGN PATENT DOCUMENTS

| | | |
|---|---|---|
| JP | 2005-091527 | 4/2005 |
| JP | 2007-101764 | 4/2007 |

*Primary Examiner* — Steven H Whitesell Gordon
*Assistant Examiner* — Jerry Brooks
(74) *Attorney, Agent, or Firm* — Amin, Turocy & Watson LLP

(57) ABSTRACT

A projection display device includes a plurality of reflective liquid crystal panels, a plurality of polarizers, and a combining optical system. The combining optical system includes a first incident surface to which first color light emitted from a first reflective liquid crystal panel and reflected by a combining surface of the combining optical system is incident and a second incident surface to which second color light emitted from a second reflective liquid crystal panel and passing through the combining surface is incident. The polarizes include a first polarizer, which reflects the first color light to the first incident surface, and a second polarizer which reflects the second color light to the second incident surface. An alignment direction of the liquid crystal of the first reflective liquid crystal panel is orthogonal to an alignment direction of the liquid crystal of the second reflective liquid crystal panel.

3 Claims, 10 Drawing Sheets

(56) References Cited

U.S. PATENT DOCUMENTS

2007/0076133 A1\* 4/2007 Shimizu ............ G02F 1/133536
 349/5
2011/0032436 A1 2/2011 Shimizu et al.

\* cited by examiner

PROJECTION DISPLAY DEVICE

CROSS-REFERENCE TO RELATED APPLICATION(S)

The present application claims priority to and incorporates by reference the entire contents of Japanese Patent Application No. 2016-170845 filed in Japan on Sep. 1, 2016.

BACKGROUND OF THE INVENTION

1. Field of the Invention

The present invention relates to a projection display device.

2. Description of the Related Art

When a liquid crystal panel is used as a light modulation element of a projection display device, misalignment called disclination is likely to occur. The disclination represents a phenomenon in which a transverse electric field is generated between neighboring pixels when there is a potential difference between image signals of the neighboring pixels in the liquid crystal panel so that liquid crystal molecules between the pixels are aligned in a direction different from an assumed direction as being affected by the transverse electric field. For example, when a voltage difference between the image signals of the pixels is increased in order to increase a luminance difference of the neighboring pixels, a change in transmittance of the pixel is generated due to the influence of the transverse electric field, and there is a possibility that a phenomenon, such as coloring, tailing, and light leakage, which causes deterioration in image quality of an image to be projected by the projection optical system may occur.

Japanese Patent No. 3888344 discloses, in order to prevent generation of coloring due to a difference of disclination generated in the plurality of liquid crystal display elements, a technique of setting an alignment direction of a liquid crystal display element in which an image is inverted and an alignment direction of another liquid crystal display element such that patterns of disclination appearing in some of pixels of white display which neighbor on pixels of black display in a plurality of liquid crystal display elements substantially match each other in an image displayed on a screen via a light combining means.

Japanese Patent No. 4661510 discloses a technique of regulating a liquid crystal alignment condition for acquisition of a high-contrast in a liquid crystal display element including a vertical alignment liquid crystal. According to Japanese Patent No. 4661510, the high-contrast image can be obtained by setting the liquid crystal alignment condition such that a line segment at the time of projecting a long axis of a liquid crystal molecule vertically onto a substrate has an angle between 42[°] and 48[°] with respect to a linear direction at the time of projecting a wire grid vertically onto the substrate, and an end of the line segment is positioned at a cross-over side between a plane including a polarization spectroscopic plane and a plane including the substrate as compared to the other end portion.

A liquid crystal panel used for a light modulation element is roughly classified into a transmissive liquid crystal panel and a reflective liquid crystal panel. It is said that the reflective liquid crystal panel is more advantageous than the transmissive liquid crystal panel in terms of obtaining higher definition, a smaller size, and higher luminance of a projection display device. There is a demand for a technique which is capable of suppressing deterioration in image quality caused by disclination and displaying a high-contrast image, in the projection display device using the reflective liquid crystal panel.

SUMMARY OF THE INVENTION

It is an object of the present invention to at least partially solve the problems in the conventional technology.

According to an aspect of present disclosure, a projection display device is provided which comprises: an illumination optical system which performs color separation of light emitted from a light source device to generate a plurality of color light; a plurality of reflective liquid crystal panels which are arranged in optical paths of the plurality of color light, respectively, to perform light modulation of the color light based on image data; a plurality of polarizers which are arranged in the optical paths of the plurality of color light respectively, to be inclined to the optical path of the color light incident to the reflective liquid crystal panel, and pass through the color light in a first polarization state incident to the reflective liquid crystal panel, and reflect the color light in a second polarization state from the reflective liquid crystal panel; a combining optical system which combines the plurality of color light, which are modulated by the reflective liquid crystal panels and are reflected by the polarizers, to generate combined light; and a projection optical system which projects the combined light generated by the combining optical system onto a projection plane, wherein the reflective liquid crystal panel includes a liquid crystal layer including a liquid crystal which has a negative dielectric anisotropy, is pre-tilted and aligned in a predetermined alignment direction, the combining optical system includes: a first incident surface to which first color light, which is emitted from a first reflective liquid crystal panel among the plurality of reflective liquid crystal panels and is reflected by a combining surface of the combining optical system, is incident; and a second incident surface to which second color light, which is emitted from a second reflective liquid crystal panel and passes through the combining surface, is incident, the polarizers include: a first polarizer, which reflects the first color light from the first reflective liquid crystal panel to the first incident surface; and a second polarizer which reflects the second color light from the second reflective liquid crystal panel to the second incident surface, and an alignment direction of the liquid crystal of the first reflective liquid crystal panel is orthogonal to an alignment direction of the liquid crystal of the second reflective liquid crystal panel.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according the invention will be described with reference to the drawings, but the invention is not limited thereto. Components of the embodiment to be described later can be appropriately combined with each other. In addition, there is also a case where some components are not used.

In the following description, an XYZ orthogonal coordinate system as a global coordinate system will be set to describe a positional relationship among the respective units referring to this XYZ orthogonal coordinate system. A direction parallel to an X-axis, which is a first axis in a predetermined plane, will be set as an X-axis direction, a direction parallel to a Y-axis, which is a second axis orthogonal to the first axis in the predetermined plane, will be set as a Y-axis direction, and a direction parallel to a Z-axis, which is a third axis orthogonal to the first axis and the second axis, will be set as a Z-axis direction. The third axis is orthogonal to the predetermined plane. In addition, one direction of the X-axis direction will be set as a +X direction, and a reverse direction of the +X direction will be set as a −X direction. One direction of the Y-axis direction will be set as a +Y direction, and a reverse direction of the +Y direction will be set as a −Y direction. One direction of the Z-axis direction will be set as a +Z direction, and a reverse direction of the +Z direction will be set as a −Z direction. In the present embodiment, the predetermined plane is parallel to a horizontal plane, and the Z-axis direction is a vertical direction. In the following description, the predetermined plane will be appropriately referred to as an XY plane.

Figure 1:
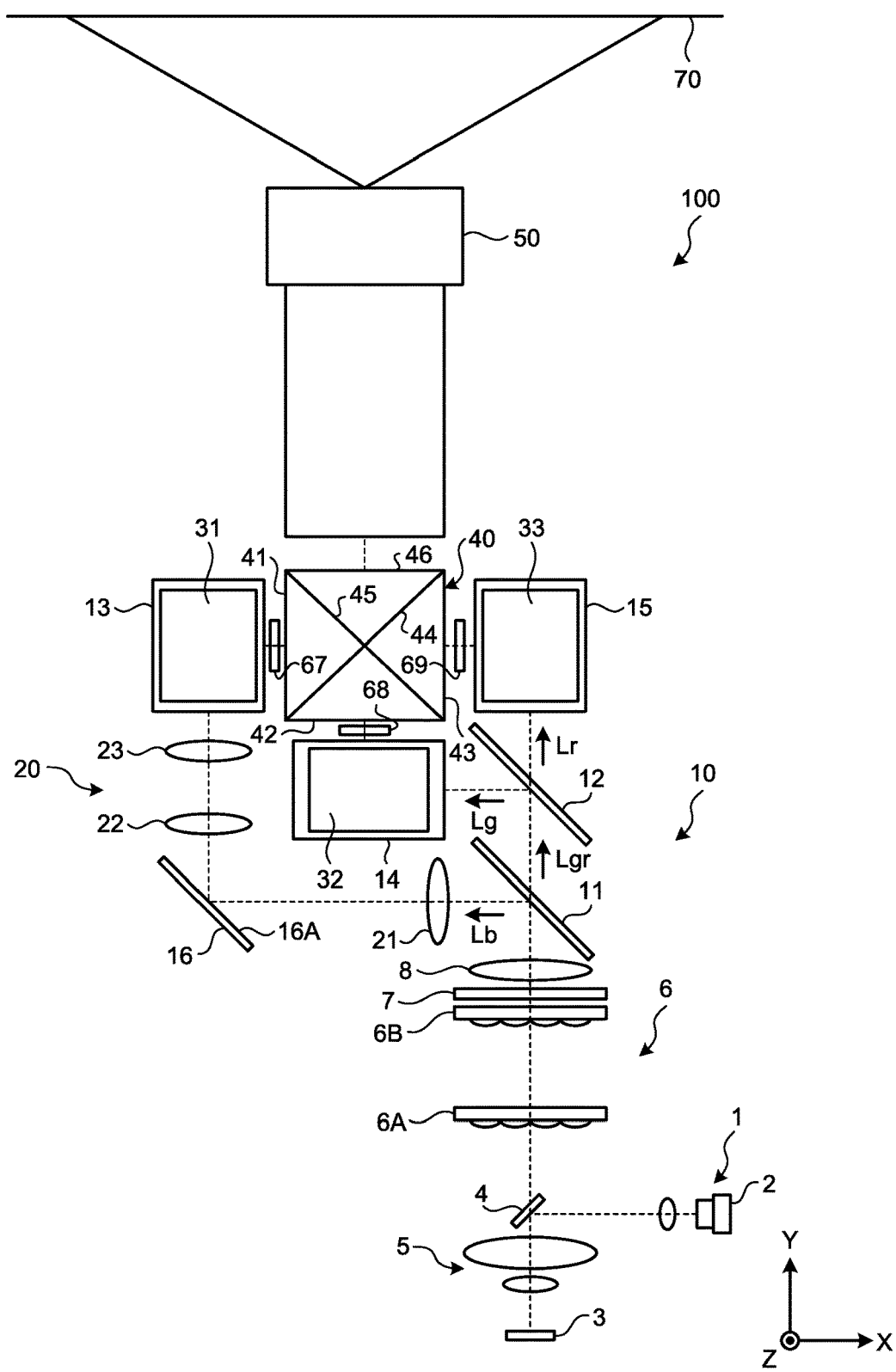
FIG. 1 is a plan view schematically illustrating an example of a projection display device according to the present embodiment.
Figure 2:
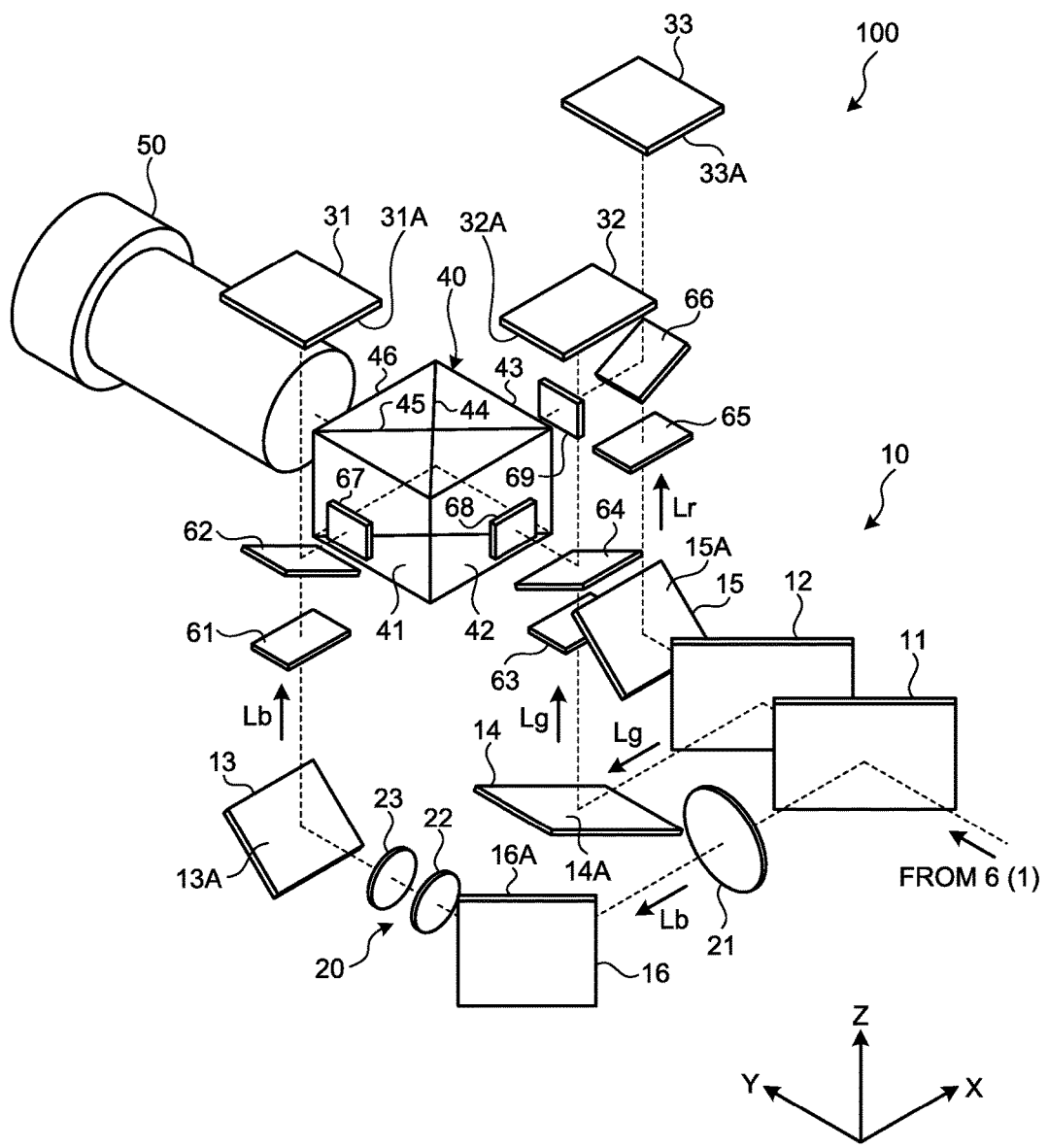
FIG. 2 is a perspective view schematically illustrating an example of the projection display device according to the present embodiment.

FIG. 1 is a plan view schematically illustrating an example of a projection display device 100 according to the present embodiment. FIG. 2 is a perspective view schematically illustrating an example of the projection display device 100 according to the present embodiment. As illustrated in FIGS. 1 and 2, the projection display device 100 includes: a light source device 1 which generates light; an illumination optical system 10 which includes a first color separation element 11 and a second color separation element 12 and generates first color light Lb, second color light Lg, and third color light Lr by performing color separation of light emitted from the light source device 1; a first reflective liquid crystal panel 31, a second reflective liquid crystal panel 32, and a third reflective liquid crystal panel 33 which are arranged in optical paths of the first color light Lb, the second color light Lg, and the third color light Lr, respectively, generated by the illumination optical system 10 and perform light modulation of the first color light Lb, the second color light Lg, and the third color light Lr, respectively, based on image data; a combining optical system 40 which combines the first color light Lb, the second color light Lg, and the third color light Lr, which have been subjected to the light modulation by the first reflective liquid crystal panel 31, the second reflective liquid crystal panel 32, and the third reflective liquid crystal panel 33, to generate combined light; and a projection optical system 50 which projects the combined light generated by the combining optical system 40.

The light source device 1 generates white light. In the present embodiment, the light source device 1 includes a solid light source 2 which emits excitation light, a phosphor 3 which generates fluorescent light by being irradiated with the excitation light, a half mirror 4 which guides the excitation light emitted from the solid light source 2 to the phosphor 3, and a light-collection optical system 5 which condenses the excitation light with which the phosphor 3 is irradiated. The solid light source 2 includes a laser diode (LD). The solid light source 2 emits blue laser light as the excitation light. The phosphor 3 is irradiated with the excitation light emitted from the solid light source 2 via the half mirror 4 and the light-collection optical system 5. When being irradiated with the excitation light, the phosphor 3 generates yellow fluorescent light. The white light is generated based on the excitation light and the fluorescent light. The white light generated by the light source device 1 is incident to the illumination optical system 10.

The illumination optical system 10 performs color separation of the light emitted from the light source device 1 to generate the plurality of color light Lb, Lg and Lr. The illumination optical system 10 includes: an integrator optical system 6 to which the light emitted from the light source device 1 is incident; a first color separation element 11 which separates the first color light Lb from the light emitted from the integrator optical system 6 and emits the light Lb in the −X direction; a second color separation element 12 which separates the light Lgr emitted from the first color separation element 11 into the second color light Lg and the third color light Lr and emits the second color light Lg in the −X direction and the third color light Lr in the +Y direction; a first reflective member 13 which reflects the first color light Lb emitted from the first color separation element 11 in the +Z direction; a second reflective member 14 which reflects the second color light Lg emitted from the second color separation element 12 in the +Z direction; a third reflective member 15 which reflects the third color light Lr emitted from the second color separation element 12 in the +Z direction; and a relay optical system 20 which is arranged in the optical path of the first color light Lb and forms an erect image.

The integrator optical system 6 equalizes illuminance of light emitted from the light source device 1. The integrator optical system 6 includes a first lens array 6A, a second lens array 6B, a polarization conversion element 7, and a condenser lens 8. A light axis of the integrator optical system 6 is parallel to the Y-axis. The light emitted from the integrator optical system 6 advances in the +Y direction.

The first lens array 6A includes a plurality of micro lenses arranged in a matrix form inside an XZ plane. The second lens array 6B includes a plurality of micro lenses arranged in a matrix form inside the XZ plane. The plurality of micro lenses of the first lens array 6A and the plurality of micro lenses of the second lens array 6B have one-to-one correspondence. The polarization conversion element 7 includes a plurality of polarization conversion units. The polarization conversion unit includes a polarization separation film, a reflective mirror, and a phase plate. The plurality of micro lenses of the second lens array 6B and the plurality of polarization conversion units of the polarization conversion element 7 have one-to-one correspondence.

The light which has been emitted from the light source device 1 and incident to the integrator optical system 6 is incident to each of the plurality of micro lenses of the first lens array 6A. A portion of the light incident to an incident surface of the integrator optical system 6 is incident to each of the plurality of micro lenses of the first lens array 6A according to each position of the micro lenses. Thus, light received by the micro lens differ from each other. The respective micro lenses of the first lens array 6A condense the light emitted from the light source device 1 onto the respective micro lenses of the second lens array 6B corresponding to the respective micro lenses of the first lens array 6A. A secondary light source image is formed in each of the plurality of micro lenses of the second lens array 6B. The second lens array 6B forms an optical pupil of the first lens array 6A.

Light from the secondary light source image formed in the respective micro lenses of the second lens array 6B is incident to the respective polarization conversion units of the polarization conversion element 7 corresponding to the micro lenses of the second lens array 6B. The light incident to the polarization conversion unit is separated into light in a first polarization state and light in a second polarization state by the polarization separation film. The light in the second polarization state separated by the polarization separation film is reflected by the reflective mirror, and then, is converted into light in the first polarization state by passing through the phase plate. That is, the light emitted from the light source device 1 is converted into light in the first polarization state by passing through the polarization conversion element 7.

The light emitted from each of the plurality of polarization conversion units is incident to the condenser lens 8. The condenser lens 8 causes the light emitted from each of the plurality of polarization conversion units to be superimposed on each other to form a single light flux. Accordingly, the illuminance distribution in each of the first reflective liquid crystal panel 31, the second reflective liquid crystal panel 32, and the third reflective liquid crystal panel 33 is equalized.

Incidentally, the integrator optical system 6 may include a rod integrator.

The first color separation element 11 is arranged on the +Y side of the integrator optical system 6. The first color separation element 11 includes a dichroic mirror. The first color separation element 11 separates the first color light Lb from the light which has emitted from the light source device 1 and passed through the integrator optical system 6. In the present embodiment, the first color separation element 11 separates the white light from the light source device 1 into blue light as the first color light Lb and the light Lgr having a different wavelength from the blue light. The first color light Lb as the blue light is reflected by the first color separation element 11 and proceeds in the −X direction. The light Lgr having the different wavelength from the blue light passes through the first color separation element 11 and proceeds in the +Y direction.

The second color separation element 12 is arranged on the +Y side of the first color separation element 11. The second color separation element 12 includes a dichroic mirror. The second color separation element 12 separates the light Lgr having the different wavelength from the blue light emitted from the first color separation element 11 into the second color light Lg and the third color light Lr. In the present embodiment, the second color separation element 12 separates the light Lgr emitted from the first color separation element 11 into green light as the second color light Lg and red light as the third color light Lr. The second color light Lg as the green light is reflected by the second color separation element 12 and proceeds in the −X direction. The third color light Lr as the red light passes through the second color separation element 12 and proceeds in the +Y direction.

The first reflective member 13 reflects the first color light Lb from the first color separation element 11 in the +Z direction. In the present embodiment, the illumination optical system 10 includes a fourth reflective member 16 which is arranged between the first color separation element 11 and the first reflective member 13. The fourth reflective member 16 reflects the first color light Lb from the first color separation element 11 in the +Y direction. The fourth reflective member 16 is arranged on the −X side of the first color separation element 11. The first color light Lb proceeding in the −X direction from the first color separation element 11 is reflected by a reflective surface 16A of the fourth reflective member 16 and proceeds in the +Y direction. The first reflective member 13 is arranged on the +Y side of the fourth reflective member 16. The first color light Lb proceeding in the +Y direction from the fourth reflective member 16 is reflected by a reflective surface 13A of the first reflective member 13 and proceeds in the +Z direction.

The second reflective member 14 reflects the second color light Lg from the second color separation element 12 in the +Z direction. The second reflective member 14 is arranged on the −X side of the second color separation element 12. The second color light Lg proceeding in the −X direction from the second color separation element 12 is reflected by a reflective surface 14A of the second reflective member 14 and proceeds in the +Z direction.

The third reflective member 15 reflects the third color light Lr from the second color separation element 12 in the +Z direction. The third reflective member 15 is arranged on the +Y side of the second color separation element 12. The third color light Lr proceeding in the +Y direction from the second color separation element 12 is reflected by a reflective surface 15A of the third reflective member 15 and proceeds in the +Z direction.

In the present embodiment, the reflective surface 13A of the first reflective member 13 and the reflective surface 15A of the third reflective member 15 are parallel to each other. The reflective surface 13A of the first reflective member 13 is parallel to the X-axis and is inclined in the +Z direction toward the +Y direction. Similarly, the reflective surface 15A of the third reflective member 15 is parallel to the X-axis and is inclined in the +Z direction toward the +Y direction.

In the present embodiment, the reflective surface 13A of the first reflective member 13 and the reflective surface 15A of the third reflective member 15 are arranged in the same plane. The plane including the reflective surface 13A of the first reflective member 13 and the reflective surface 15A of the third reflective member 15 is orthogonal to a plane including the reflective surface 14A of the second reflective member 14. In the present embodiment, the reflective surface 14A of the second reflective member 14 is parallel to the Y-axis and is inclined in the +Z direction toward the −X direction.

The relay optical system 20 is arranged in the optical path of the first color light Lb between the first color separation element 11 and the first reflective liquid crystal panel 31. In the present embodiment, the relay optical system 20 is arranged in the optical path of the first color light Lb between the first color separation element 11 and the first reflective member 13. The relay optical system 20 images an erect image of an object, which is on an object plane side of the relay optical system 20, on an image plane side of the relay optical system 20.

The relay optical system 20 includes: a first condenser lens 21 arranged between the first color separation element 11 and the fourth reflective member 16; and a second condenser lens 22 and a third condenser lens 23 which are arranged between the fourth reflective member 16 and the first reflective member 13. Each of the first condenser lens 21, the second condenser lens 22, and the third condenser lens 23 is a convex lens. The third condenser lens 23 is optically conjugate with the second lens array 6B. Since the third condenser lens 23 and the second lens array 6B are optically conjugate, and the second lens array 6B acts as the pupil of the first lens array 6A, images of the respective micro lenses of the first lens array 6A are formed between the second lens array 6B and the third condenser lens 23.

In the present embodiment, the relay optical system 20 forms an erect image of an object on the image plane side of the relay optical system 20. For example, when an image X is formed on the object plane side of the relay optical system 20, the relay optical system 20 forms an inverted image of the image X between the first color separation element 11 and the first reflective liquid crystal panel 31 which is the image plane, and forms an erect image of the image X on the image plane side of the relay optical system 20. In the present embodiment, the image X represents each portion of images of light emitted from the light source device 1 and received by the plurality of micro lenses of the first lens array 6A.

The first reflective liquid crystal panel 31 is arranged in the optical path of the first color light Lb. The first reflective liquid crystal panel 31 is a light modulation element which performs light modulation of the first color light Lb from the first reflective member 13 based on image data. The first reflective liquid crystal panel 31 is arranged on the +Z side of the first reflective member 13. The first color light Lb proceeding in the +Z direction from the first reflective member 13 is incident to the first reflective liquid crystal panel 31.

The first reflective liquid crystal panel 31 includes an incident surface 31A to which the first color light Lb of the first reflective member 13 is incident. The first reflective liquid crystal panel 31 reflects the first color light Lb from the first reflective member 13 in the −Z direction.

The second reflective liquid crystal panel 32 is arranged in the optical path of the second color light Lg. The second reflective liquid crystal panel 32 is a light modulation element which performs light modulation of the second color light Lg from the second reflective member 14 based on image data. The second reflective liquid crystal panel 32 is arranged on the +Z side of the second reflective member 14. The second color light Lg proceeding in the +Z direction from the second reflective member 14 is incident to the second reflective liquid crystal panel 32.

The second reflective liquid crystal panel 32 includes an incident surface 32A to which the second color light Lg of the second reflective member 14 is incident. The second reflective liquid crystal panel 32 reflects the second color light Lg from the second reflective member 14 in the −Z direction.

The third reflective liquid crystal panel 33 is arranged in the optical path of the third color light Lr. The third reflective liquid crystal panel 33 is a light modulation element which performs light modulation of the third color light Lr from the third reflective member 15 based on image data. The third reflective liquid crystal panel 33 is arranged on the +Z side of the third reflective member 15. The third color light Lr proceeding in the +Z direction from the third reflective member 15 is incident to the third reflective liquid crystal panel 33.

The third reflective liquid crystal panel 33 includes an incident surface 33A to which the third color light Lr of the third reflective member 15 is incident. The third reflective liquid crystal panel 33 reflects the third color light Lr from the third reflective member 15 in the −Z direction.

The incident surface 31A of the first reflective liquid crystal panel 31 is parallel to the XY plane and faces the −Z direction. Similarly, the incident surface 32A of the second reflective liquid crystal panel 32 and the incident surface 33A of the third reflective liquid crystal panel 33 are parallel to the XY plane and face the −Z direction. In the present embodiment, the incident surface 31A of the first reflective liquid crystal panel 31, the incident surface 32A of the second reflective liquid crystal panel 32, and the incident surface 33A of the third reflective liquid crystal panel 33 face the same direction and are arranged in the same plane which is parallel to the XY plane.

A polarizer 61 and a polarizer 62 are arranged in the optical path of the first color light Lb between the first reflective member 13 and the first reflective liquid crystal panel 31. A polarizer 63 and a polarizer 64 are arranged in the optical path of the second color light Lg between the second reflective member 14 and the second reflective liquid crystal panel 32. A polarizer 65 and a polarizer 66 are arranged in the optical path of the third color light Lr between the third reflective member 15 and the third reflective liquid crystal panel 33.

The polarizer 61 passes the first color light Lb in the first polarization state which has been reflected by the first reflective member 13. The first color light Lb in the first polarization state which has passed through the polarizer 61 passes through the polarizer 62 and is incident to the first reflective liquid crystal panel 31. The first reflective liquid crystal panel 31 performs light modulation of the first color light Lb passing through the polarizer 61 and the polarizer 62 based on the image data. The polarizer 62 is arranged in the optical path of the first color light Lb between the polarizer 61 and the first reflective liquid crystal panel 31. The polarizer 62 passes the first color light Lb in the first polarization state from the polarizer 61, and reflects the first color light Lb in the second polarization state from the first reflective liquid crystal panel 31 to the combining optical system 40.

The polarizer 63 passes the second color light Lg in the first polarization state which has been reflected by the second reflective member 14. The second color light Lg in the first polarization state which has passed through the polarizer 63 passes through the polarizer 64 and is incident to the second reflective liquid crystal panel 32. The second reflective liquid crystal panel 32 performs light modulation of the second color light Lg passing through the polarizer 63 and the polarizer 64 based on the image data. The polarizer 64 is arranged in the optical path of the second color light Lg between the polarizer 63 and the second reflective liquid crystal panel 32. The polarizer 64 passes the second color light Lg in the first polarization state from the polarizer 63, and reflects the second color light Lg in the second polarization state from the second reflective liquid crystal panel 32 to the combining optical system 40.

The polarizer 65 passes the third color light Lr in the first polarization state which has been reflected by the third reflective member 15. The third color light Lr in the first polarization state which has passed through the polarizer 65 passes through the polarizer 66 and is incident to the third reflective liquid crystal panel 33. The third reflective liquid crystal panel 33 performs light modulation of the third color light Lr passing through the polarizer 65 and the polarizer 66 based on the image data. The polarizer 66 is arranged in the optical path of the third color light Lr between the polarizer 65 and the third reflective liquid crystal panel 33. The polarizer 66 passes the third color light Lr in the first polarization state from the polarizer 65, and reflects the third color light Lr in the second polarization state from the third reflective liquid crystal panel 33 to the combining optical system 40.

A transmissive polarizer 67 is arranged in the optical path of the first color light Lb between the polarizer 62 and the combining optical system 40. The transmissive polarizer 67 passes the first color light Lb in the second polarization state out of the first color light Lb which has been emitted from the polarizer 62 to the combining optical system 40 and prevents passage of the first color light Lb in the first polarization state which is unnecessary.

A transmissive polarizer 68 is arranged in the optical path of the second color light Lg between the polarizer 64 and the combining optical system 40. The transmissive polarizer 68 passes the second color light Lg in the second polarization state out of the second color light Lg which has been emitted from the polarizer 64 to the combining optical system 40 and prevents passage of the second color light Lg in the first polarization state which is unnecessary.

A transmissive polarizer 69 is arranged in the optical path of the third color light Lr between the polarizer 66 and the combining optical system 40. The transmissive polarizer 69 passes the third color light Lr in the second polarization state out of the third color light Lr which has been emitted from the polarizer 66 to the combining optical system 40 and prevents passage of the third color light Lr in the first polarization state which is unnecessary.

Incidentally, the first polarization state is, for example, a P-polarized state. The second polarization state is, for example, an S-polarized state.

The combining optical system 40 combines the first color light Lb which has been modulated by the first reflective liquid crystal panel 31, the second color light Lg which has been modulated by the second reflective liquid crystal panel 32, and the third color light Lr which has been modulated by the third reflective liquid crystal panel 33 to generate the combined light. In the present embodiment, the combining optical system 40 includes a cross dichroic prism. The combining optical system 40 includes: a first incident surface 41 to which the first color light Lb which has been modulated by the first reflective liquid crystal panel 31 is incident; a second incident surface 42 to which the second color light Lg which has been modulated by the second reflective liquid crystal panel 32 is incident; a third incident surface 43 to which the third color light Lr which has been modulated by the third reflective liquid crystal panel 33 is incident; and an emitting surface 46 which emits the combined light.

The first incident surface 41 is parallel to a YZ plane and faces the −X direction. The second incident surface 42 is parallel to the XZ plane and faces the −Y direction. The third incident surface 43 is parallel to the YZ plane and faces the +X direction. The emitting surface 46 is parallel to the XZ plane and faces the +Y direction.

The combining optical system 40 includes: a first combining surface 44 to combine the first color light Lb incident from the first incident surface 41 and the second color light Lg incident from the second incident surface 42; and a second combining surface 45 to combine the second color light Lg incident from the second incident surface 42 and the third color light Lr incident from the third incident surface 43. The first combining surface 44 and the second combining surface 45 are parallel to the Z-axis. The first combining surface 44 and the second combining surface 45 are orthogonal to each other.

The first combining surface 44 reflects the first color light Lb which has emitted from the first reflective liquid crystal panel 31 and been incident from the first incident surface 41 via the polarizer 62. The first combining surface 44 passes the second color light Lg which has emitted from the second reflective liquid crystal panel 32 and been incident from the second incident surface 42 via the polarizer 64.

The second combining surface 45 passes the second color light Lg which has emitted from the second reflective liquid crystal panel 32 and been incident from the second incident surface 42 via the polarizer 64. The second combining surface 45 reflects the third color light Lr which has emitted from the third reflective liquid crystal panel 33 and been incident from the third incident surface 43 via the polarizer 66.

The projection optical system 50 projects the combined light, which has been generated by the combining optical system 40 and emitted from the emitting surface 46, onto a screen 70 which is a projection plane.

Figure 3:
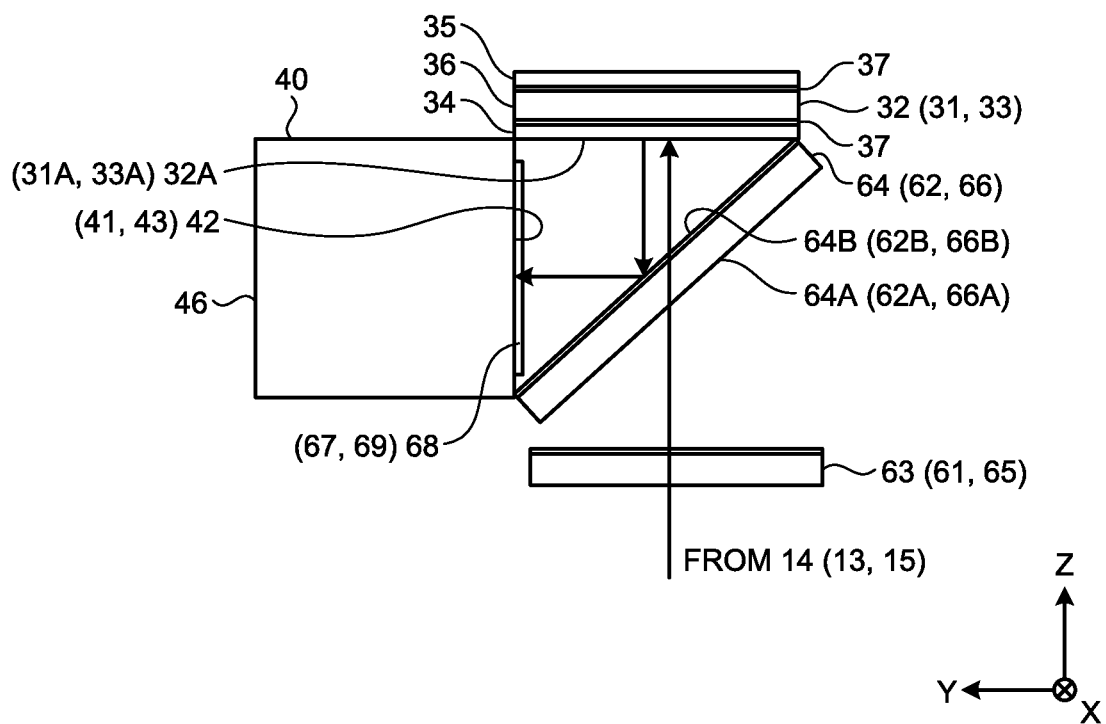
FIG. 3 is a view schematically illustrating a part of the projection display device according to the present embodiment.

FIG. 3 is a view schematically illustrating a part of the projection display device 100 according to the present embodiment. FIG. 3 is the view schematically illustrating: the second reflective liquid crystal panel 32; the polarizer 63 and the polarizer 64 arranged in the optical path of the second color light Lg between the second reflective liquid crystal panel 32 and the second reflective member 14; and the transmissive polarizer 68 arranged in the optical path of the second color light Lg between the polarizer 64 and the combining optical system 40.

As illustrated in FIGS. 2 and 3, the second reflective liquid crystal panel 32 is arranged in the +Z direction more than the combining optical system 40. The polarizer 64 is arranged on the −Y side of the combining optical system 40 and is arranged on the −Z side of the second reflective liquid crystal panel 32. The polarizer 63 is arranged on the −Z side of the polarizer 64.

The second reflective liquid crystal panel 32 includes a transparent substrate 34 including transparent electrodes, an active matrix substrate 35 including reflective electrodes, and a liquid crystal layer 36 provided between the transparent substrate 34 and the active matrix substrate 35. An alignment film 37 is provided on a top surface of the transparent substrate 34 facing the liquid crystal layer 36.

The alignment film 37 is provided on a top surface of the active matrix substrate 35 facing the liquid crystal layer 36.

The reflective electrodes are arranged in a matrix form for every pixel in the active matrix substrate 35. The transparent substrate 34 and the active matrix substrate 35 are arranged such that the transparent electrode and the reflective electrode oppose each other. An outer surface of the transparent substrate 34 includes the incident surface 32A. The liquid crystal layer 36 includes a nematic liquid crystal which is arranged between the transparent electrode and the reflective electrode. The nematic liquid crystal has a negative dielectric anisotropy. The nematic liquid crystal is provided between the transparent substrate 34 and the active matrix substrate 35 in a state where a pre-tilt angle is given.

The polarizer 63 is a wire grid polarizer. The polarizer 63 passes the second color light Lg in the first polarization state which has been reflected by the second reflective member 14. The second color light Lg which has passed through the polarizer 63 is incident to the second reflective liquid crystal panel 32 via the polarizer 64. The second reflective liquid crystal panel 32 performs light modulation of the second color light Lg from the polarizer 64 based on the image data. In the present embodiment, the second color light Lg in the first polarization state is incident to the polarizer 63 from the polarization conversion element 7. The polarizer 63 passes the second color light Lg of the first polarization state from the second reflective member 14.

The polarizer 64 is a wire grid polarizer. The polarizer 64 is arranged in the optical path of the second color light Lg between the polarizer 63 and the second reflective liquid crystal panel 32. The polarizer 64 passes the second color light Lg in the first polarization state which has been emitted from the polarizer 63 and is incident to the second reflective liquid crystal panel 32. The second color light Lg which has passed through the polarizer 64 is incident to the incident surface 32A of the transparent substrate 34 of the second reflective liquid crystal panel 32. The second color light Lg which has been incident to the incident surface 32A is incident to the liquid crystal layer 36 via the transparent substrate 34, passes through the liquid crystal layer 36, and then, is reflected by the reflective electrode of the active matrix substrate 35. The second color light Lg which has been reflected by the reflective electrode of the active matrix substrate 35 passes through the liquid crystal layer 36 again, and then, is emitted from the transparent substrate 34 of the second reflective liquid crystal panel 32. The second color light Lg in the second polarization state is emitted from the second reflective liquid crystal panel 32. The second color light Lg in the second polarization state which has been emitted from the second reflective liquid crystal panel 32 is incident to the polarizer 64.

The polarizer 64 includes an incident surface 64A to which the second color light Lg from the polarizer 63 is incident and a reflective surface 64B which reflects the second color light Lg from the second reflective liquid crystal panel 32. The polarizer 64 is inclined with respect to the optical path of the second color light Lg incident to the second reflective liquid crystal panel 32. The incident surface 64A of the polarizer 64 and the optical path of the second color light Lg incident to the incident surface 64A of the polarizer 64 intersect each other at an angle of 45[°]. The second color light Lg reflected by the second reflective liquid crystal panel 32 proceeds in the −Z direction. The reflective surface 64B of the polarizer 64 and the optical path of the second color light Lg incident to the reflective surface 64B of the polarizer 64 intersect each other at an angle of 45[°].

The polarizer 64 reflects the second color light Lg in the second polarization state from the second reflective liquid crystal panel 32 in the +Y direction. The second color light Lg in the second polarization state which has been emitted from the second reflective liquid crystal panel 32 is reflected by the polarizer 64, proceeds in the +Y direction, and is incident to the combining optical system 40. The unnecessary second color light Lg in the first polarization state out of the second color light Lg incident from the polarizer 64 to the combining optical system 40 is eliminated by the transmissive polarizer 68, and the second color light Lg in the second polarization state is incident to the combining optical system 40.

As above, each action of the second reflective liquid crystal panel 32, the polarizer 63, the polarizer 64, the transmissive polarizer 68, and the combining optical system 40 has been described with reference to FIG. 3. Similarly to the polarizer 64, the polarizer 62 includes an incident surface 62A and a reflective surface 62B, and the polarizer 66 includes an incident surface 66A and a reflective surface 66B. Each action of the first reflective liquid crystal panel 31, the polarizer 61, the polarizer 62, the transmissive polarizer 67, and the combining optical system 40 and each action of the third reflective liquid crystal panel 33, the polarizer 65, the polarizer 66, the transmissive polarizer 69, and the combining optical system 40 are the same as each action of the second reflective liquid crystal panel 32, the polarizer 63, the polarizer 64, the transmissive polarizer 68, and the combining optical system 40, and thus, will not be described.

Figure 4:
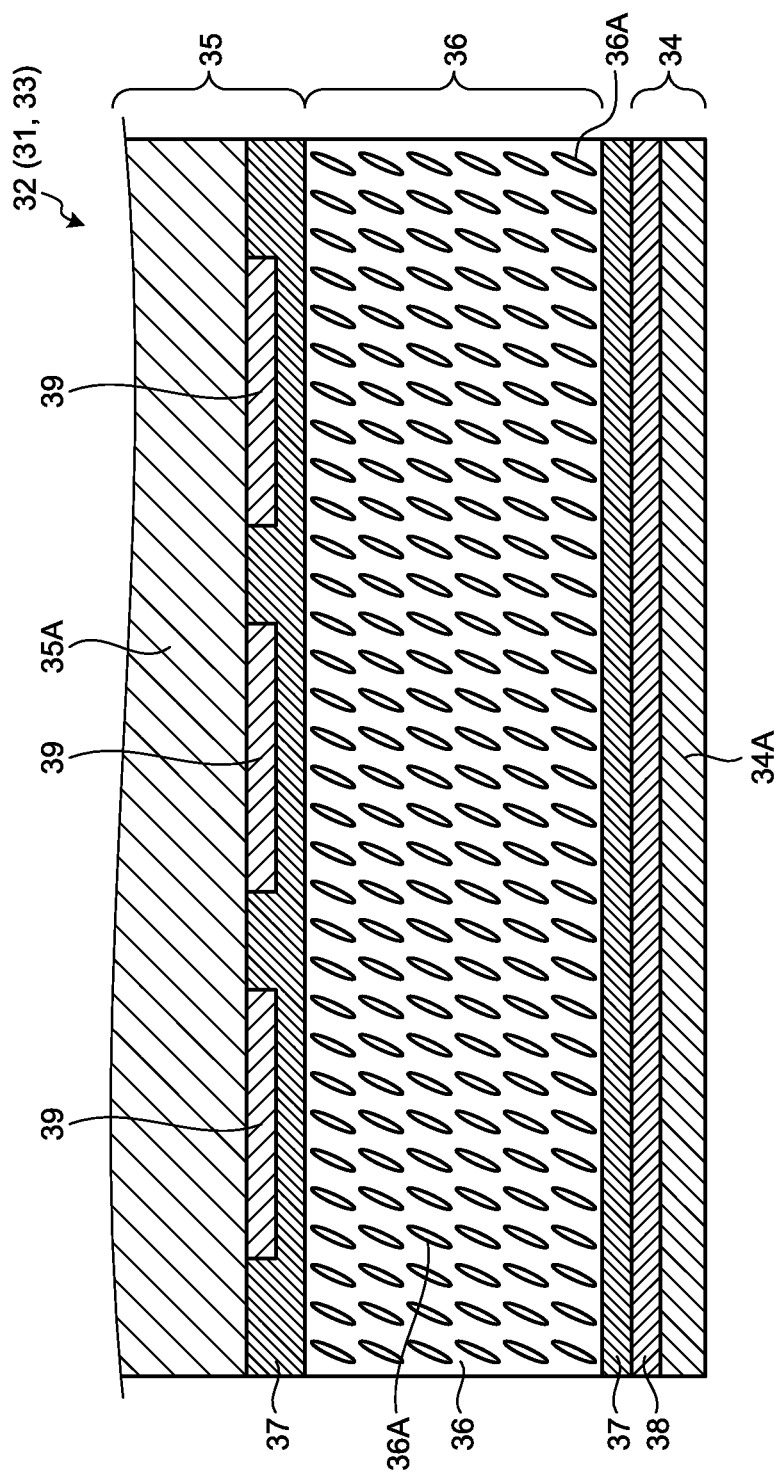
FIG. 4 is a cross-sectional view illustrating an example of a reflective liquid crystal panel according to the present embodiment.

Next, the reflective liquid crystal panel according to the present embodiment will be described. FIG. 4 is a cross-sectional view illustrating an example of the second reflective liquid crystal panel 32 according to the present embodiment. Incidentally, a structure of the first reflective liquid crystal panel 31 and a structure of the third reflective liquid crystal panel 33 are the same as a structure of the second reflective liquid crystal panel 32.

As illustrated in FIG. 4, the second reflective liquid crystal panel 32 includes the transparent substrate 34, the active matrix substrate 35 opposing the transparent substrate 34, and the liquid crystal layer 36 including a plurality of liquid crystals 36A arranged between the transparent substrate 34 and the active matrix substrate 35.

The transparent substrate 34 includes a glass substrate 34A and a transparent electrode 38 formed on a top surface of the glass substrate 34A opposing the active matrix substrate 35. The transparent electrode 38 is formed in the entire region of the top surface of the glass substrate 34A. The transparent electrode 38 is formed using a transparent conductive material, for example, indium tin oxide (ITO). The common potential is applied to the transparent electrode 38 in a plurality of pixels.

The active matrix substrate 35 includes a silicon substrate 35A, switching elements such as a thin film transistor (TFT) provided for the plurality of pixels respectively on a top surface of the silicon substrate 35A, and reflective electrodes 39 connected to the switching element and provided for the plurality of pixels, respectively. The plurality of reflective electrodes 39 are arranged in a matrix form on the top surface of the silicon substrate 35A. The reflective electrode 39 is formed using a metal material such as aluminum (Al) having a high reflectance in a visible region.

The reflective electrodes 39 and the pixels have one-to-one correspondence. In the present embodiment, the reflective electrode 39 has a square shape. The pixel also has a square shape.

The alignment film 37 to cover the transparent electrode 38 is formed in the transparent substrate 34. The alignment film 37 to cover the reflective electrode 39 is formed in the active matrix substrate 35. The alignment film 37 causes the liquid crystal 36A of the liquid crystal layer 36 to be aligned in a predetermined alignment direction. The alignment film 37 may be, for example, an oblique vapor deposition film formed using an inorganic material such as silicon dioxide ($SiO_2$) or a polymer film such as polyimide whose surface has been subjected to rubbing treatment.

In the present embodiment, the liquid crystal 36A of the liquid crystal layer 36 is the nematic liquid crystal having the negative dielectric anisotropy. The dielectric anisotropy means a difference between a parallel dielectric constant and a vertical dielectric constant to a long axis of the liquid crystal. The negative dielectric anisotropy means a state where the difference between the parallel dielectric constant and the vertical dielectric constant to the long axis of the liquid crystal becomes negative.

The liquid crystal 36A of the liquid crystal layer 36 is vertically aligned by the alignment film 37. That is, the liquid crystal 36A is the vertical alignment liquid crystal in the present embodiment.

When a voltage between the transparent electrode 38 and the reflective electrode 39 is zero, the liquid crystal 36A is substantially vertically aligned with respect to the top surface of the silicon substrate 35A. That is, the second reflective liquid crystal panel 32 is displayed in black in a normally black display mode in the present embodiment. When a voltage is applied between the transparent electrode 38 and the reflective electrode 39, the liquid crystal 36A is tilted in the predetermined alignment direction and changes transmittance of light.

Figure 5:
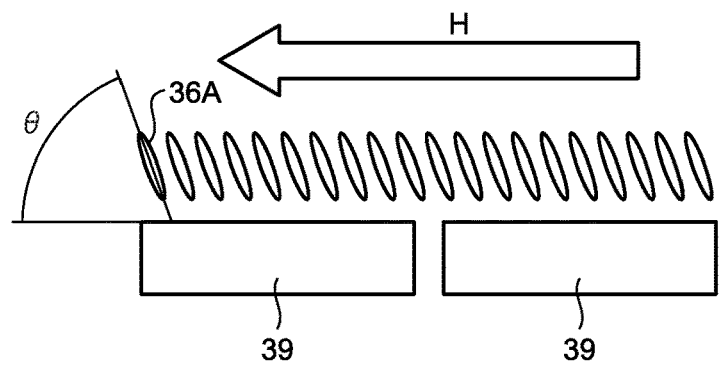
FIG. 5 is a view schematically illustrating a liquid crystal according to the present embodiment.
Figure 6:
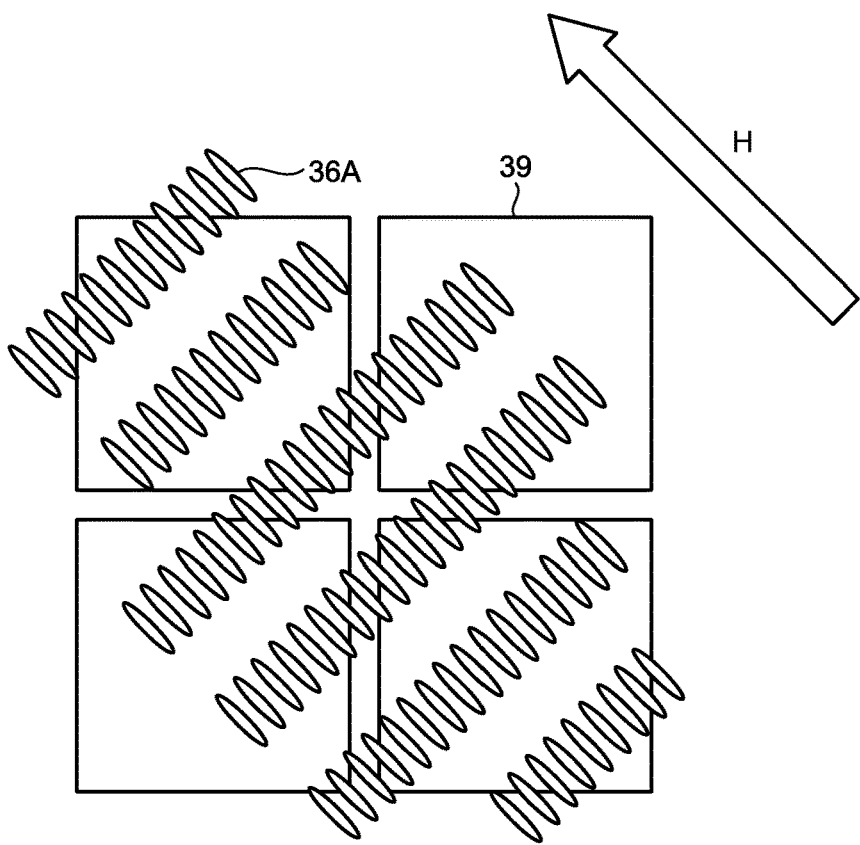
FIG. 6 is a view schematically illustrating the liquid crystal according to the present embodiment.

FIGS. 5 and 6 are views schematically illustrating the liquid crystal 36A according to the present embodiment. As illustrated in FIG. 5, a pre-tilt angle θ is given to the liquid crystal 36A. The pre-tilt angle θ means an angle formed between the top surface of the active matrix substrate 35 in which the reflective electrode 39 is formed and the long axis of the liquid crystal 36A. The liquid crystal 36A is vertically aligned in the state where the pre-tilt angle θ is given.

As illustrated in FIGS. 5 and 6, the liquid crystal 36A is pre-tilted in a predetermined alignment direction H. In the present embodiment, the pre-tilt angle θ is 85[°] or lager and 89[°] or smaller. In the present embodiment, the alignment direction H of the liquid crystal 36A is a direction parallel to a diagonal of the reflective electrode 39 in the square shape. That is, the alignment direction H of the liquid crystal 36A is set as a direction having 45[°] with respect to one side of the reflective electrode 39 in the square shape. Incidentally, the alignment direction H of the liquid crystal 36A may be a direction having 42[°] or larger and 48[°] or smaller with respect to one side of the reflective electrode 39 in the square shape.

Figure 7:
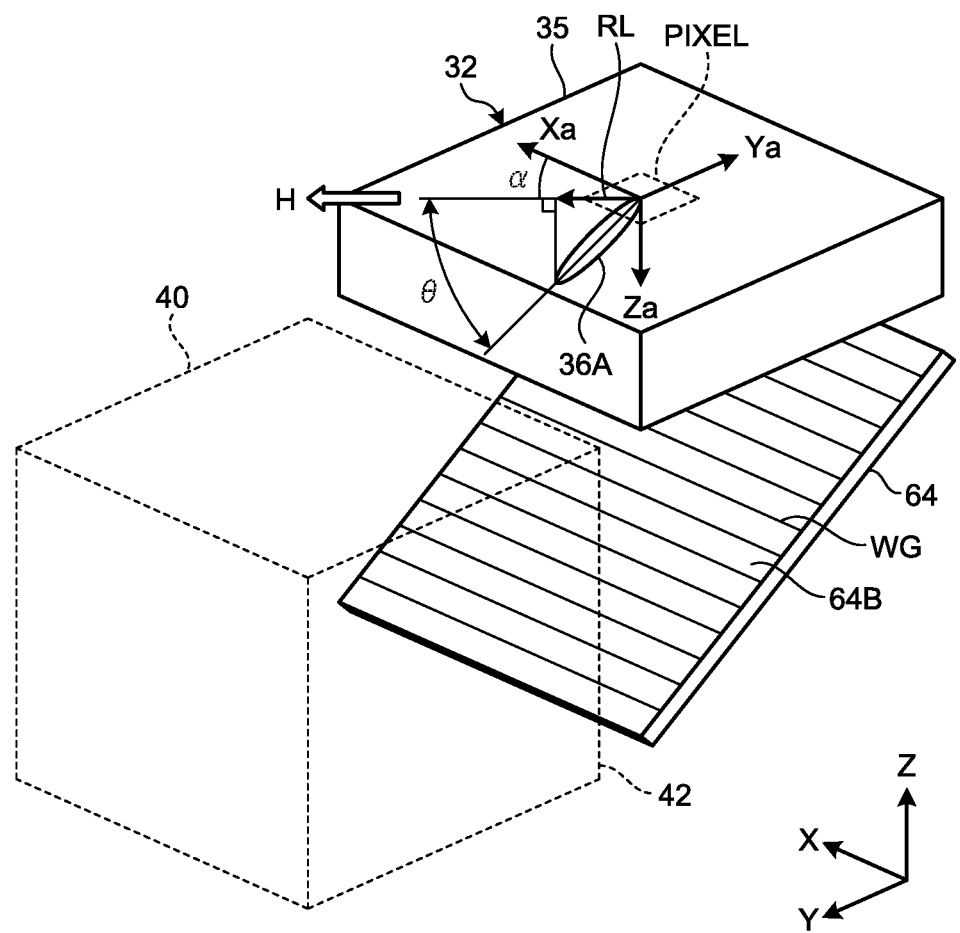
FIG. 7 is a perspective view schematically illustrating a relationship among an alignment direction of the liquid crystal of the reflective liquid crystal panel, a polarizer, and a combining optical system according to the present embodiment.

FIG. 7 is a perspective view schematically illustrating a relationship among the alignment direction H of the liquid crystal 36A of the second reflective liquid crystal panel 32, the polarizer 64, and the combining optical system 40 according to the present embodiment. As illustrated in FIG. 7, a local coordinate system (XaYaZa coordinate system) is defined in the second reflective liquid crystal panel 32. An Xa-axis and a Ya-axis are defined in the top surface of the active matrix substrate 35 of the second reflective liquid crystal panel 32. The Xa-axis and the Ya-axis are orthogonal to each other. The Za-axis is orthogonal to the top surface of the active matrix substrate 35. In FIG. 7, the X-axis of the XYZ orthogonal coordinate system and the Xa-axis of the local coordinate system are parallel to each other. Similarly, the Y-axis and the Ya-axis are parallel to each other, and the Z-axis and the Za-axis are parallel to each other. A +Xa direction of the local coordinate system corresponds to the +X direction of the XYZ orthogonal coordinate system. A +Ya direction of the local coordinate system corresponds to the −Y direction of the XYZ orthogonal coordinate system. A +Za direction of the local coordinate system corresponds to the −Z direction of the XYZ orthogonal coordinate system. As illustrated in FIG. 7, the alignment direction H of the liquid crystal 36A is set to a direction which is parallel to a diagonal of the pixel of the second reflective liquid crystal panel 32 and approaches the combining optical system 40. As described above, the pixels and the reflective electrodes 39 have one-to-one correspondence, and each of the pixel and the reflective electrode 39 has the square shape.

FIG. 7 illustrates the state where the pre-tilt angle θ is given to the liquid crystal 36A. In the present embodiment, the polarizer 64 is the wire grid polarizer configured of a plurality of fine slits. An extending direction of the slit of a wire grid WG of the wire grid polarizer is the X-axis direction (Xa-axis direction). That is, the slit of the wire grid WG and the X-axis (Xa-axis) are parallel to each other.

In the present embodiment, the alignment direction H of the liquid crystal 36A is set to the direction which is parallel to the diagonal of the pixel of the second reflective liquid crystal panel 32 and approaches the combining optical system 40. In other words, a case is considered where to define a projection line segment RL obtained by projecting the long axis of the liquid crystal 36A on the active matrix substrate 35 and a reference line obtained by vertically projecting the extending direction of the slit of the wire grid WG on the active matrix substrate 35. In the case, the projection line segment RL has an angle of α[°] with respect to the reference line, and one end of the projection line segment RL, which corresponds to an end that is separated from the active matrix substrate 35 between both ends of the liquid crystal 36A, is arranged at a position far from an intersection between a plane including the reflective surface 64B of the polarizer 64 and a plane including the top surface of the active matrix substrate 35, than the other end of the projection line segment RL. In the present embodiment, α[°] is 45[°]. The reference line is parallel to the X-axis and the Xa-axis.

In the present embodiment, a high-contrast image is obtained on the screen 70 as the projection plane since the alignment direction H of the liquid crystal 36A is set to the direction which is parallel to the diagonal of the pixel of the second reflective liquid crystal panel 32 and approaches the combining optical system 40.

Figure 8:
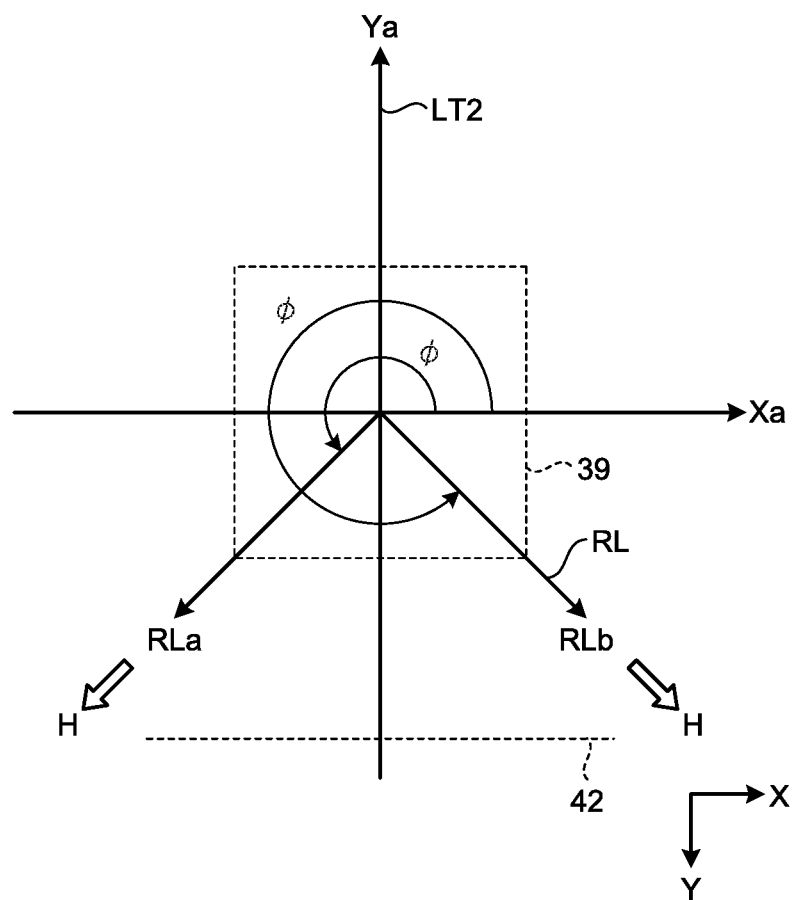
FIG. 8 is a view illustrating a vector of a projection line segment relative to a liquid crystal alignment condition according to the present embodiment.

FIG. 8 is a view illustrating vectors RLa and RLb of the projection line segment RL in an XaYa plane relative to a liquid crystal alignment condition according to the present embodiment. The vectors RLa and RLb of the projection line segment RL represent the alignment direction of the liquid crystal 36A in which the high-contrast image can be obtained. When defining each angle φ of the vectors RLa and RLb counterclockwise from the Xa-axis on the basis of the Xa-axis, the angle φ of the vector RLa is 225[°], and the angle φ of the vector RLb is 315[°].

That is, when the reflective electrode 39 as the pixel electrode has a square shape and sides of the reflective electrode 39 are parallel to the Xa-axis and the Ya-axis, the vectors RLa and RLb representing the alignment direction H of the liquid crystal 36A are parallel to the diagonal of the reflective electrode 39.

The vector RLa representing the alignment direction H of the liquid crystal 36A and the vector RLb representing the alignment direction H of the liquid crystal 36A are orthogonal to each other. On the basis of a reference line LT2 orthogonal to the second incident surface 42 of the combining optical system 40, the vector RLa is set as a direction which is parallel to the diagonal of the pixel (the reflective electrode 39) and approaches the combining optical system 40 toward a first direction as one side (−Xa side) with respect to the reference line LT2. The vector RLb is set as a direction which is parallel to the diagonal of the pixel (the reflective electrode 39) and approaches the combining optical system 40 toward a second direction as the other side (+Xa side) with respect to the reference line LT2. The first direction and the second direction are orthogonal to each other.

Figure 9:
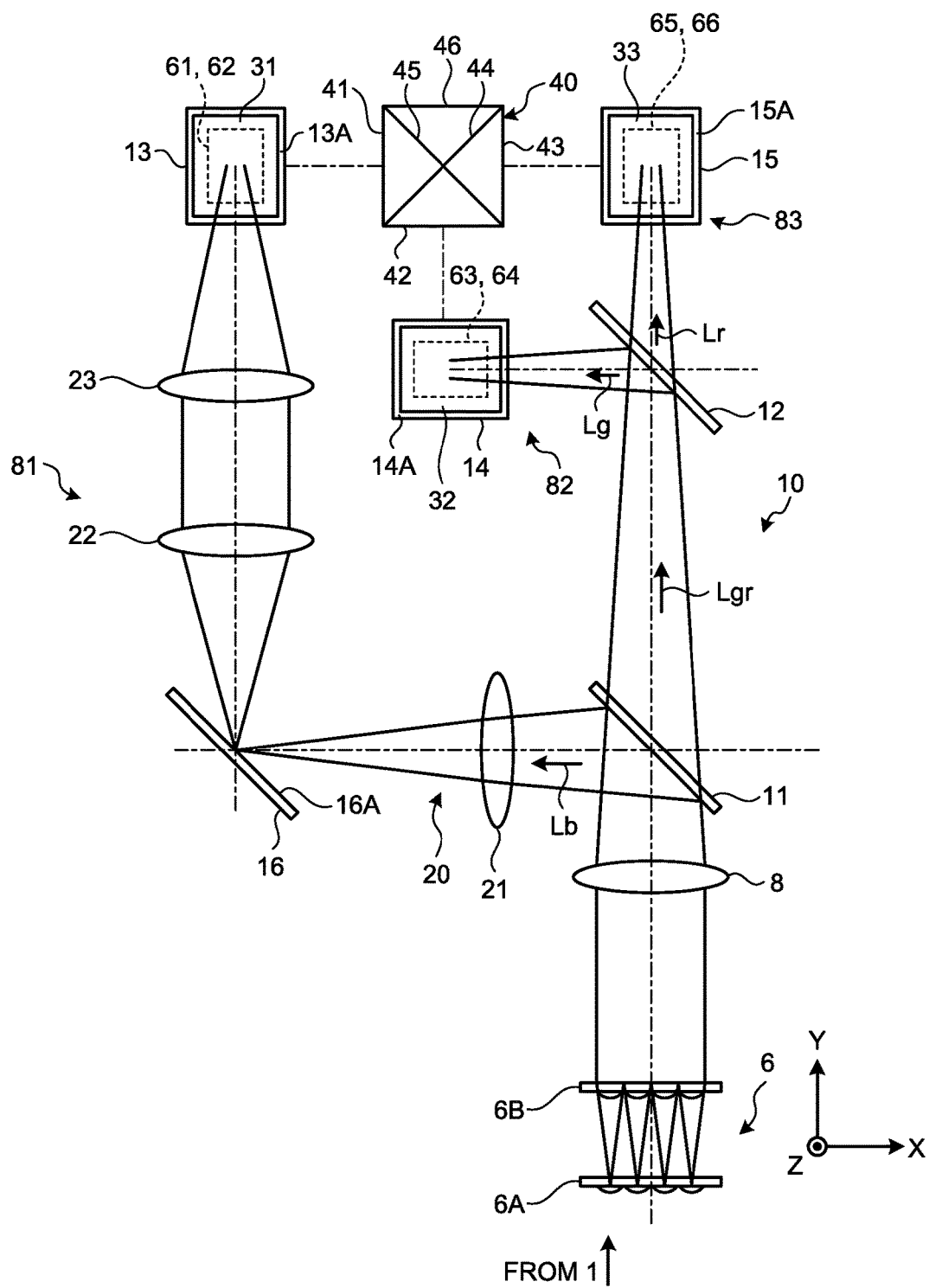
FIG. 9 is a plan view for describing action of the projection display device according to the present embodiment.
Figure 10:
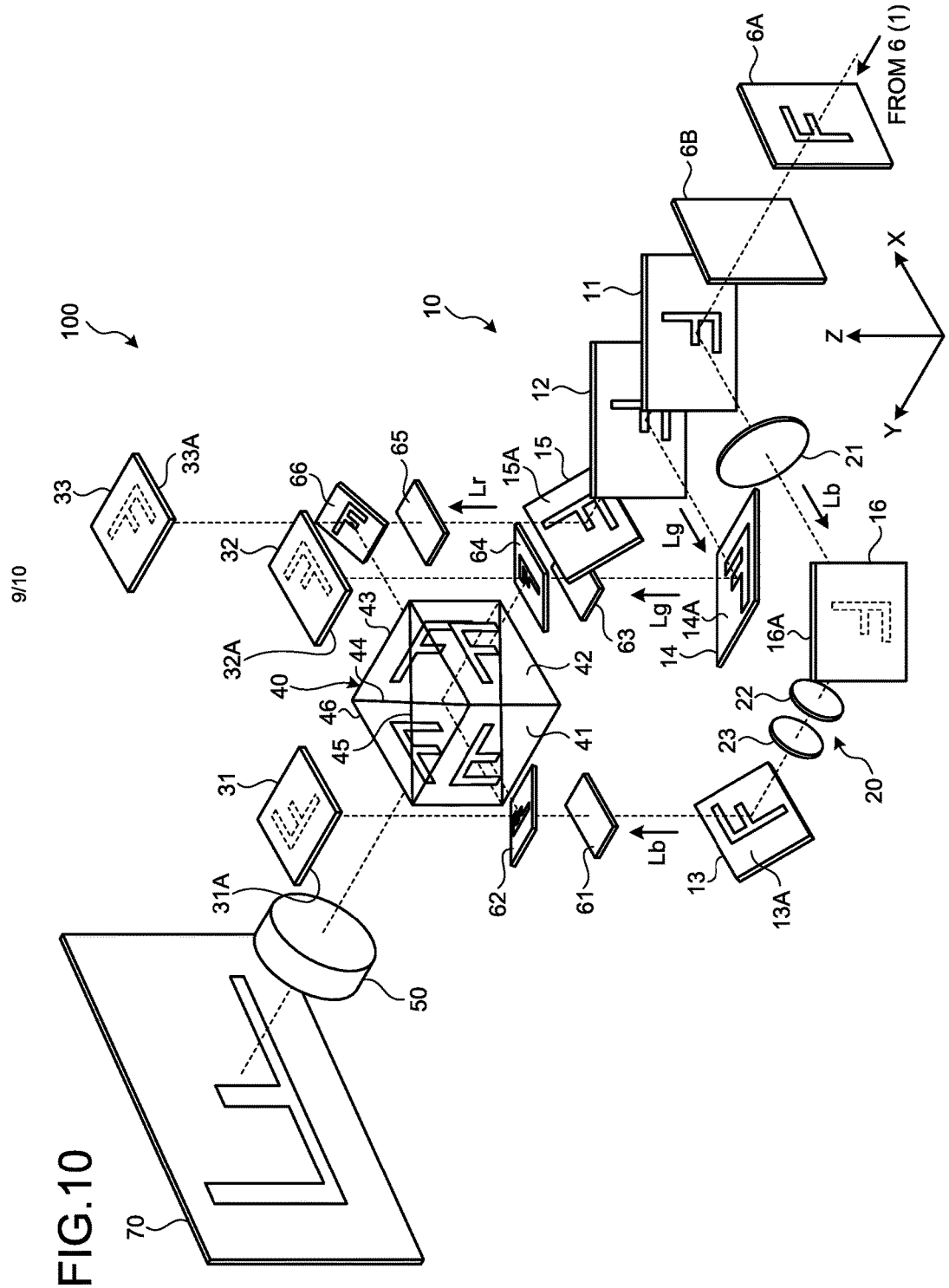
FIG. 10 is a perspective view for describing the action of the projection display device according to the present embodiment.

Next, action of the projection display device 100 according to the present embodiment will be described. FIG. 9 is a plan view for describing the action of the projection display device 100 according to the present embodiment. FIG. 10 is a perspective view for describing the action of the projection display device 100 according to the present embodiment.

In the present embodiment, when there is a deviation in intensity distribution of light emitted from the light source device 1, an optical system of the projection display device 100 including the illumination optical system 10 is constructed such that a deviation of light intensity distribution formed on the image plane side of the projection optical system 50 by a plurality of optical parts arranged in the optical path of the first color light Lb, a deviation of light intensity distribution formed on the image plane side of the projection optical system 50 by a plurality of optical parts arranged in the optical path of the second color light Lg, and a deviation of light intensity distribution formed on the image plane side of the projection optical system 50 by a plurality of optical parts arranged in the optical path of the third color light Lr match each other.

In the following description, an optical system configured of the plurality of optical parts arranged in the optical path of the first color light Lb will be appropriately referred to as a first color light optical system 81. An optical system configured of the plurality of optical parts arranged in the optical path of the second color light Lg will be appropriately referred to as a second color light optical system 82. An optical system configured of the plurality of optical parts arranged in the optical path of the third color light Lr will be appropriately referred to as a third color light optical system 83.

The first color light optical system 81 includes the first color separation element 11, the fourth reflective member 16, the first reflective member 13, the relay optical system 20, the polarizer 61, the polarizer 62, and the first reflective liquid crystal panel 31.

The second color light optical system 82 includes the first color separation element 11, the second color separation element 12, the second reflective member 14, the polarizer 63, the polarizer 64, and the second reflective liquid crystal panel 32.

The third color light optical system 83 includes the first color separation element 11, the second color separation element 12, the third reflective member 15, the polarizer 65, the polarizer 66, and the third reflective liquid crystal panel 33.

In the present embodiment, the deviation of the light intensity distribution of the light source device 1 formed by the first color light optical system 81 on the emitting surface 46 side of the combining optical system 40, the deviation of the light intensity distribution of the light source device 1 formed by the second color light optical system 82 on the emitting surface 46 side of the combining optical system 40, and the deviation of the light intensity distribution of the light source device 1 formed by the third color light optical system 83 on the emitting surface 46 side of the combining optical system 40 match each other.

Action of the first color light optical system 81 will be described. Light, which has been emitted from the light source device 1, equalized in a plane vertical to the light axis of the integrator optical system 6 by the integrator optical system 6, and passed through the condenser lens 8, is separated into the first color light Lb and the light Lgr having the different wavelength from the first color light Lb in the first color separation element 11. The first color light Lb is reflected by the first color separation element 11 in the XY plane. First reflection of the first color light Lb is performed in the first color separation element 11.

As illustrated in FIG. 9, the condenser lens 8 and the first condenser lens 21 of the relay optical system 20 condenses the first color light Lb on the reflective surface 16A of the fourth reflective member 16. In the first color light optical system 81, a first intermediate image of a light source image is formed on the reflective surface 16A of the fourth reflective member 16. That is, a first imaging point of the first color light optical system 81 is formed on the reflective surface 16A of the fourth reflective member 16.

The first color light Lb reflected by the first color separation element 11 is incident to the fourth reflective member 16. The first color light Lb is reflected by the fourth reflective member 16 in the XY plane. Second reflection of the first color light Lb is performed in the fourth reflective member 16.

The first color light Lb reflected by the fourth reflective member 16 is incident to the first reflective member 13. The first color light Lb is reflected by the first reflective member 13 inside the YZ plane. Third reflection of the first color light Lb is performed in the first reflective member 13.

The first color light Lb which has been reflected by the first reflective member 13 passes through the polarizer 61 and the polarizer 62 and is incident to the first reflective liquid crystal panel 31. The first color light Lb is reflected in the −Z direction by the first reflective liquid crystal panel 31. Fourth reflection of the first color light Lb is performed in the first reflective liquid crystal panel 31.

As illustrated in FIG. 9, the second condenser lens 22 and the third condenser lens 23 of the relay optical system 20 condense the first color light Lb on the incident surface 31A of the first reflective liquid crystal panel 31. The first lens array 6A and the incident surface 31A of the first reflective liquid crystal panel 31 are optically conjugate.

The first color light Lb which has been reflected by the first reflective liquid crystal panel 31 is incident to the polarizer 62. The first color light Lb is reflected by the polarizer 62 in the XZ plane. Fifth reflection of the first color light Lb is performed in the polarizer 62.

The first color light Lb which has been reflected by the polarizer 62 is incident to the first incident surface 41 of the combining optical system 40.

In this manner, the first color light Lb is reflected by the plurality of optical parts five times in the first color light optical system 81, and is incident to the combining optical system 40.

A mirror image of an image is formed through the reflection by the optical parts. The mirror image means an image of an object created by reflection of a plane mirror. In other words, the mirror image means an image which is inverted only laterally or vertically, and the object and the mirror image thereof have a plane-symmetric relationship.

In addition, the first color light Lb is condensed twice by the relay optical system 20. That is, the first color light Lb is imaged twice in the first color light optical system 81, and is incident to the combining optical system 40. An inverted image of an image is formed by the relay optical system 20. The inverted image means an image of an object created using a convex lens or the like, and the image of the object and the inverted image thereof have a 180[°] rotationally symmetric relationship about the light axis.

Next, action of the second color light optical system 82 will be described. The light, which has been emitted from the light source device 1, equalized in the plane vertical to the light axis of the integrator optical system 6 by the integrator optical system 6, and passed through the condenser lens 8, is separated into the first color light Lb and the light Lgr having the different wavelength from the first color light Lb in the first color separation element 11. The light Lgr which has passed through the first color separation element 11 is separated into the second color light Lg and the third color light Lr in the second color separation element 12. The second color light Lg is reflected by the second color separation element 12 in the XY plane. First reflection of the second color light Lg is performed in the second color separation element 12.

The second color light Lg reflected by the second color separation element 12 is incident to the second reflective member 14. The second color light Lg is reflected by the second reflective member 14 in the XZ plane. Second reflection of the second color light Lg is performed in the second reflective member 14.

The second color light Lg which has been reflected by the second reflective member 14 passes through the polarizer 63 and the polarizer 64 and is incident to the second reflective liquid crystal panel 32. The second color light Lg is reflected in the −Z direction by the second reflective liquid crystal panel 32. Third reflection of the second color light Lg is performed in the second reflective liquid crystal panel 32.

As illustrated in FIG. 9, the condenser lens 8 condenses the second color light Lg on the incident surface 32A of the second reflective liquid crystal panel 32. The first lens array 6A and the incident surface 32A of the second reflective liquid crystal panel 32 are optically conjugate.

The second color light Lg which has been reflected by the second reflective liquid crystal panel 32 is incident to the polarizer 64. The second color light Lg is reflected by the polarizer 64 in the YZ plane. Fourth reflection of the second color light Lg is performed in the polarizer 64.

The second color light Lg which has been reflected by the polarizer 64 is incident to the second incident surface 42 of the combining optical system 40.

In this manner, the second color light Lg is reflected by the plurality of optical parts four times in the second color light optical system 82, and is incident to the combining optical system 40. In addition, the second color light Lg is imaged once in the second color light optical system 82, and is incident to the combining optical system 40.

Next, action of the third color light optical system 83 will be described. The light Lgr, which has been emitted from the light source device 1, equalized in the plane vertical to the light axis of the integrator optical system 6 by the integrator optical system 6, and passed through the condenser lens 8 and the first color separation element 11, is separated into the second color light Lg and the third color light Lr in the second color separation element 12. The third color light Lr passes through the second color separation element 12.

The third color light Lr which has passed through the second color separation element 12 is incident to the third reflective member 15. The third color light Lr is reflected by the third reflective member 15 in the YZ plane. First reflection of the third color light Lr is performed in the third reflective member 15.

The third color light Lr which has been reflected by the third reflective member 15 passes through the polarizer 65 and the polarizer 66 and is incident to the third reflective liquid crystal panel 33. The third color light Lr is reflected in the −Z direction by the third reflective liquid crystal panel 33. Second reflection of the third color light Lr is performed in the third reflective liquid crystal panel 33.

As illustrated in FIG. 9, the condenser lens 8 condenses the third color light Lr on the incident surface 33A of the third reflective liquid crystal panel 33. The first lens array 6A and the incident surface 33A of the third reflective liquid crystal panel 33 are optically conjugate.

The third color light Lr which has been reflected by the third reflective liquid crystal panel 33 is incident to the polarizer 66. The third color light Lr is reflected by the polarizer 66 inside the XZ plane. Third reflection of the third color light Lr is performed in the polarizer 66.

The third color light Lr which has been reflected by the polarizer 66 is incident to the third incident surface 43 of the combining optical system 40.

In this manner, the third color light Lr is reflected by the plurality of optical parts three times in the third color light optical system 83, and is incident to the combining optical system 40. In addition, the third color light Lr is imaged once in the third color light optical system 83, and is incident to the combining optical system 40.

Next, a description will be given regarding a change of the deviation of the light intensity distribution of the light source device 1 in each of the first color light optical system 81, the second color light optical system 82, and the third color light optical system 83 with reference to FIG. 10. In the description with reference to FIG. 10, a directivity (direction) of a light source image indicating the deviation of light intensity distribution will be illustrated to correspond to a graphical directivity of a letter "F" in order to facilitate understanding of the deviation of light intensity distribution. Incidentally, the letter "F" is schematically illustrated in each optical part in FIG. 10. The light source image, to be exact, however, each image at each micro lens of the first lens array 6A is imaged only on a corresponding conjugate plane. That is, the light source image is imaged in each of the third condenser lens 23, the first reflective liquid crystal panel 31, the second reflective liquid crystal panel 32, and the third reflective liquid crystal panel 33 each of which has a positional relationship of being optically conjugate with the first lens array 6A. In the XZ plane, a reference direction is set to a direction of a light source image whose "F" is read in a right direction when seen from a direction toward the screen 70 from the light source device 1 in the light axis direction with the +Z direction as the top of "F".

A description will be given regarding the direction of the light source image indicating the deviation of light intensity distribution in the first color light optical system 81. The mirror image of the light source image is formed by reflection in the first color separation element 11. In addition, the light source image is inverted by the action of the first condenser lens 21 of the relay optical system 20. Accordingly, the direction of the light source image becomes a direction rotated by 180[°] (inverted direction) in the reflective surface 16A of the fourth reflective member 16 as illustrated in FIG. 10.

The mirror image of the light source image is formed through reflection in the fourth reflective member 16. In addition, the direction of the light source image is inverted by the action of the second condenser lens 22 and the third condenser lens 23 of the relay optical system 20. Accordingly, the direction of the light source image becomes the reference direction without being inverted and rotated in the reflective surface 13A of the first reflective member 13 as illustrated in FIG. 10.

The mirror image of the light source image is formed through reflection in the first reflective member 13. Accordingly, the direction of the light source image becomes a vertically inverted direction in the incident surface 31A of the first reflective liquid crystal panel 31 as illustrated in FIG. 10.

The mirror image of the light source image is formed through reflection in the first reflective liquid crystal panel 31. Accordingly, the direction of the light source image becomes the direction rotated by 180[°] (inverted direction) in the reflective surface of the polarizer 62 as illustrated in FIG. 10.

The mirror image of the light source image is formed through reflection in the polarizer 62. Accordingly, the direction of the light source image becomes the vertically inverted direction in the first incident surface 41 of the combining optical system 40 as illustrated in FIG. 10.

Next, a description will be given regarding the direction of the light source image indicating the deviation of light intensity distribution in the second color light optical system 82. The mirror image of the light source image is formed through reflection in the second color separation element 12. Accordingly, the direction of the light source image becomes a direction rotated by 180[°] (inverted direction) in the reflective surface 14A of the second reflective member 14 as illustrated in FIG. 10.

The mirror image of the light source image is formed through reflection in the second reflective member 14. Accordingly, the direction of the light source image becomes a vertically inverted direction in the incident surface 32A of the second reflective liquid crystal panel 32 as illustrated in FIG. 10.

The mirror image of the light source image is formed through reflection in the second reflective liquid crystal panel 32. In addition, the light source image is inverted by the action of the condenser lens 8. Accordingly, the direction of the light source image becomes the vertically inverted direction in the reflective surface of the polarizer 64 as illustrated in FIG. 10.

The mirror image of the light source image is formed through reflection in the polarizer 64. Accordingly, the direction of the light source image becomes the reference direction without being inverted and rotated in the second incident surface 42 of the combining optical system 40 as illustrated in FIG. 10.

Next, a description will be given regarding the direction of the light source image indicating the deviation of light intensity distribution in the third color light optical system 83. The mirror image of the light source image is formed through reflection in the third reflective member 15. Accordingly, the direction of the light source image becomes a vertically inverted direction in the incident surface 33A of the third reflective liquid crystal panel 33 as illustrated in FIG. 10.

The mirror image of the light source image is formed through reflection in the third reflective liquid crystal panel 33. In addition, the light source image is inverted by the action of the condenser lens 8. Accordingly, the direction of the light source image becomes the reference direction without being inverted and rotated in the reflective surface of the polarizer 66 as illustrated in FIG. 10.

The mirror image of the light source image is formed through reflection in the polarizer 66. Accordingly, the direction of the light source image becomes the vertically inverted direction in the third incident surface 43 of the combining optical system 40 as illustrated in FIG. 10.

The light source image formed in the first incident surface 41 and the light source image formed in the second incident surface 42 are combined in the first combining surface 44 of the combining optical system 40. As illustrated in FIG. 10, the light source image formed in the first incident surface 41 and the light source image formed in the second incident surface 42 match each other in the first combining surface 44 of the combining optical system 40.

The light source image formed in the second incident surface 42 and the light source image formed in the third incident surface 43 are combined in the second combining surface 45 of the combining optical system 40. As illustrated in FIG. 10, the light source image formed in the second incident surface 42 and the light source image formed in the third incident surface 43 match each other in the second combining surface 45 of the combining optical system 40.

Accordingly, the direction of the light source image formed by the first color light optical system 81 on the emitting surface 46 side of the combining optical system 40, the direction of the light source image formed by the second color light optical system 82 on the emitting surface 46 side of the combining optical system 40, and the direction of the light source image formed by the third color light optical system 83 on the emitting surface 46 side of the combining optical system 40 match each other.

That is, in the present embodiment as illustrated in FIG. 10, the direction of the light source image incident to the first incident surface 41 and the direction of the light source image incident to the second incident surface 42 are mirror-symmetric to each other with respect to the first combining surface 44. In addition, the direction of the light source image incident to the second incident surface 42 and the direction of the light source image incident to the third incident surface 43 are mirror-symmetric to each other with respect to the second combining surface 45. The directions of the light source images of the color light of the respective colors emitted from the combining optical system 40 match each other, due to such a relationship among the direction of the light source image incident to the first incident surface 41 of the combining optical system 40, the direction of the light source image incident to the second incident surface 42, and the direction of the light source image incident to the third incident surface 43.

Figure 11:
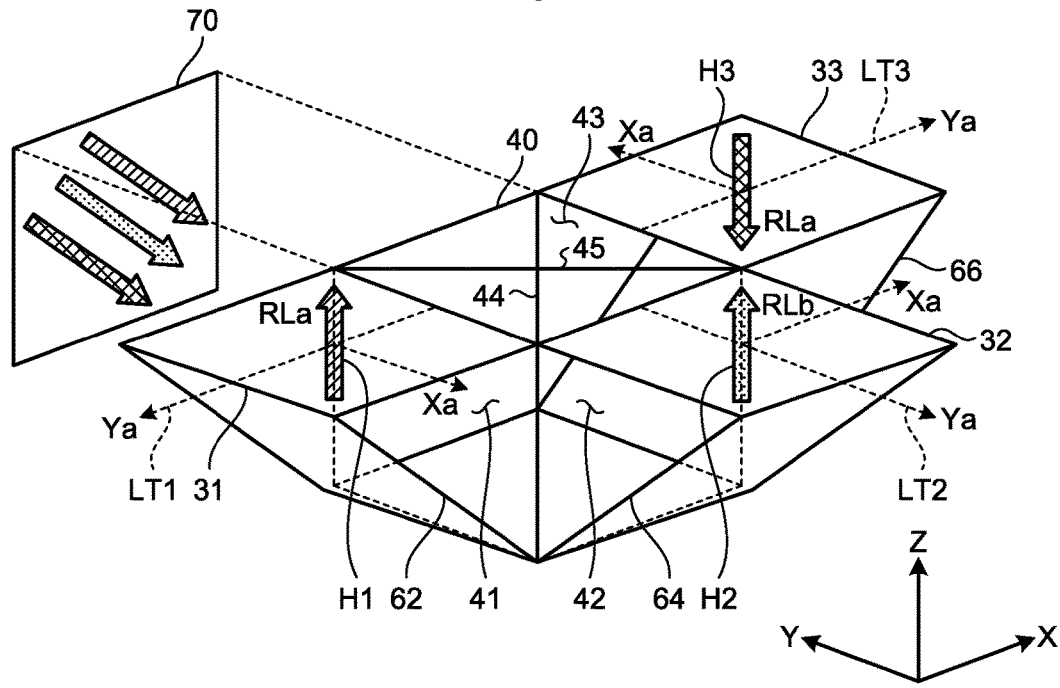
FIG. 11 is a plan view for describing action of the projection display device according to the present embodiment.

Next, the alignment direction H of the liquid crystal 36A according to the present embodiment will be described. FIG. 11 is a view schematically illustrating a relationship among an alignment direction H1 of the liquid crystal 36A of the first reflective liquid crystal panel 31, an alignment direction H2 of the liquid crystal 36A of the second reflective liquid crystal panel 32, and an alignment direction H3 of the liquid crystal 36A of the third reflective liquid crystal panel 33 according to the present embodiment.

As illustrated in FIG. 11, provided are: the polarizer 62 which reflects the first color light Lb from the first reflective liquid crystal panel 31 toward the first incident surface 41 of the combining optical system 40; the polarizer 64 which reflects the second color light Lg from the second reflective liquid crystal panel 32 toward the second incident surface 42 of the combining optical system 40; and the polarizer 66 which reflects the third color light Lr from the third reflective liquid crystal panel 33 toward the third incident surface 43 of the combining optical system 40.

The first color light Lb which has been incident to the first incident surface 41 of the combining optical system 40 is reflected by the first combining surface 44. The second color light Lg which has been incident to the second incident surface 42 of the combining optical system 40 passes through the first combining surface 44 and is combined with the first color light Lb.

The third color light Lr which has been incident to the third incident surface 43 of the combining optical system 40 is reflected by the second combining surface 45. The second color light Lg which has been incident to the second incident surface 42 of the combining optical system 40 passes through the second combining surface 45 and is combined with the third color light Lr.

A case is considered where the reference line LT1 orthogonal to the first incident surface 41 of the combining optical system 40 is defined in the first reflective liquid crystal panel 31. In the case, the alignment direction H1 of the liquid crystal 36A of the first reflective liquid crystal panel 31 is set as a direction which is parallel to the diagonal of the pixel (the reflective electrode 39) of the first reflective liquid crystal panel 31, and approaches the first incident surface 41 of the combining optical system 40 toward one side (the +Y side) with respect to the reference line LT1. When the local coordinate system (XaYaZa coordinate system) is defined in the first reflective liquid crystal panel 31, the reference line LT1 is parallel to the Ya-axis. The alignment direction H1 of the liquid crystal 36A of the first reflective liquid crystal panel 31 is set as a direction which is parallel to the diagonal of the pixel (the reflective electrode 39) of the first reflective liquid crystal panel 31 and approaches the combining optical system 40 toward the first direction as one side (−Xa side) with respect to the reference line LT1.

A case is considered where the reference line LT2 orthogonal to the second incident surface 42 of the combining optical system 40 is defined in the second reflective liquid crystal panel 32. In the case, the alignment direction H2 of the liquid crystal 36A of the second reflective liquid crystal panel 32 is set as a direction which is parallel to the diagonal of the pixel (the reflective electrode 39) of the second reflective liquid crystal panel 32, and approaches the second incident surface 42 of the combining optical system 40 toward the other side (the +λ side) with respect to the reference line LT2. When the local coordinate system (XaYaZa coordinate system) is defined in the second reflective liquid crystal panel 32, the reference line LT2 is parallel to the Ya-axis. The alignment direction H2 of the liquid crystal 36A of the second reflective liquid crystal panel 32 is set as a direction which is parallel to the diagonal of the pixel (the reflective electrode 39) of the second reflective liquid crystal panel 32 and approaches the combining optical system 40 toward the second direction as the other side (+Xa side) with respect to the reference line LT2.

A case is considered where a reference line LT3 orthogonal to the third incident surface 43 of the combining optical system 40 is defined in the third reflective liquid crystal panel 33. In the case, the alignment direction H3 of the liquid crystal 36A of the third reflective liquid crystal panel 33 is set as a direction which is parallel to the diagonal of the pixel (the reflective electrode 39) of the third reflective liquid crystal panel 33, and approaches the third incident surface 43 of the combining optical system 40 toward one side (the −Y side) with respect to the reference line LT3. When the local coordinate system (XaYaZa coordinate system) is defined in the third reflective liquid crystal panel 33, the reference line LT3 is parallel to the Ya-axis. The alignment direction H3 of the liquid crystal 36A of the third reflective liquid crystal panel 33 is set as a direction which is parallel to the diagonal of the pixel (the reflective electrode 39) of the third reflective liquid crystal panel 33, and approaches the combining optical system 40 toward the first direction as one side (−Xa side) with respect to the reference line LT3.

That is, the alignment direction H1 of the liquid crystal 36A of the first reflective liquid crystal panel 31 corresponds to the vector RLa between the vectors RLa and RLb that have been described with reference to FIG. 8. The alignment direction H2 of the liquid crystal 36A of the second reflective liquid crystal panel 32 corresponds to the vector RLb between the vectors RLa and RLb that have been described with reference to FIG. 8. The alignment direction H3 of the liquid crystal 36A of the third reflective liquid crystal panel 33 corresponds to the vector RLa between the vectors RLa and RLb that have been described with reference to FIG. 8.

That is, a case is considered where it is assumed that the first reflective liquid crystal panel 31 and the second reflective liquid crystal panel 32 are the reflective liquid crystal panels having the same structure. In the case, the alignment direction H1 of the liquid crystal 36A of the first reflective liquid crystal panel 31 and the alignment direction H2 of the liquid crystal 36A of the second reflective liquid crystal panel 32 are set such that the alignment direction H1 of the liquid crystal 36A of the first reflective liquid crystal panel 31 is orthogonal to the alignment direction H2 of the liquid crystal 36A of the second reflective liquid crystal panel 32, in the present embodiment.

Similarly, a case is considered where it is assumed that the second reflective liquid crystal panel 32 and the third reflective liquid crystal panel 33 are the reflective liquid crystal panels having the same structure. In the case, the alignment direction H2 of the liquid crystal 36A of the second reflective liquid crystal panel 32 and the alignment direction H3 of the liquid crystal 36A of the third reflective liquid crystal panel 33 are set such that the alignment direction H2 of the liquid crystal 36A of the second reflective liquid crystal panel 32 is orthogonal to the alignment direction H3 of the liquid crystal 36A of the third reflective liquid crystal panel 33, in the present embodiment.

In addition, the alignment direction H1 of the liquid crystal 36A of the first reflective liquid crystal panel 31 and the alignment direction H3 of the liquid crystal 36A of the third reflective liquid crystal panel 33 are set such that the alignment direction H1 of the liquid crystal 36A of the first reflective liquid crystal panel 31 and the alignment direction H3 of the liquid crystal 36A of the third reflective liquid crystal panel 33 are parallel.

In addition, in the present embodiment as illustrated in FIG. 11, a first space having a triangular prism shape is formed by the incident surface 31A of the first reflective liquid crystal panel 31 to which the first color light Lb in the first polarization state is incident, the reflective surface 62B of the polarizer 62 to which the first color light Lb in the second polarization state from the first reflective liquid crystal panel 31A is incident, and the first incident surface 41 of the combining optical system 40.

In addition, a second space having a triangular prism shape is formed by the incident surface 32A of the second reflective liquid crystal panel 32 to which the second color light Lg in the first polarization state is incident, the reflective surface 64B of the polarizer 64 to which the second color light Lg in the second polarization state from the second reflective liquid crystal panel 32 is incident, and the second incident surface 42 of the combining optical system 40.

In addition, a third space having a triangular prism shape is formed by the incident surface 33A of the third reflective liquid crystal panel 33 to which the third color light Lr in the first polarization state is incident, the reflective surface 66B of the polarizer 66 to which the third color light Lr in the second polarization state from the third reflective liquid crystal panel 33 is incident, and the third incident surface 43 of the combining optical system 40.

The incident surface 31A of the first reflective liquid crystal panel 31, the incident surface 32A of the second reflective liquid crystal panel 32, and the incident surface 33A of the third reflective liquid crystal panel 33 face the same direction and are arranged in the same plane which is parallel to the XY plane.

The alignment direction H1 of the liquid crystal 36A of the first reflective liquid crystal panel 31 and the alignment direction H2 of the liquid crystal 36A of the second reflective liquid crystal panel 32 have a mirror-symmetric relationship with respect to a first virtual plane including the first combining surface 44.

In addition, the image data of the first reflective liquid crystal panel 31 and the image data of the second reflective liquid crystal panel 32 have a mirror-symmetric relationship with respect to the first virtual plane including the first combining surface 44.

In addition, the reflective surface 62B of the polarizer 62 and the reflective surface 64B of the polarizer 64 have a mirror-symmetric relationship with respect to the first virtual plane including the first combining surface 44.

In addition, the first incident surface 41 of the combining optical system 40 and the second incident surface 42 have a mirror-symmetric relationship with respect to the first virtual plane including the first combining surface 44.

In addition, the alignment direction H2 of the liquid crystal 36A of the second reflective liquid crystal panel 32 and the alignment direction H3 of the liquid crystal 36A of the third reflective liquid crystal panel 33 have a mirror-symmetric relationship with respect to a second virtual plane including the second combining surface 45.

In addition, the image data of the second reflective liquid crystal panel 32 and the image data of the third reflective liquid crystal panel 33 have a mirror-symmetric relationship with respect to the second virtual plane including the second combining surface 45.

In addition, the reflective surface 64B of the polarizer 64 and the reflective surface 66B of the polarizer 66 have a mirror-symmetric relationship with respect to the second virtual plane including the second combining surface 45.

In addition, the second incident surface 42 of the combining optical system 40 and the third incident surface 43 have a mirror-symmetric relationship with respect to the second virtual plane including the second combining surface 45.

Accordingly, as illustrated in FIG. 11, the alignment direction H1 of the liquid crystal 36A of the first reflective liquid crystal panel 31, the alignment direction H2 of the liquid crystal 36A of the second reflective liquid crystal panel 32, and the alignment direction H3 of the liquid crystal 36A of the third reflective liquid crystal panel 33 match each other in the image projected onto the screen 70 via the combining optical system 40 and the projection optical system 50.

Figure 12:
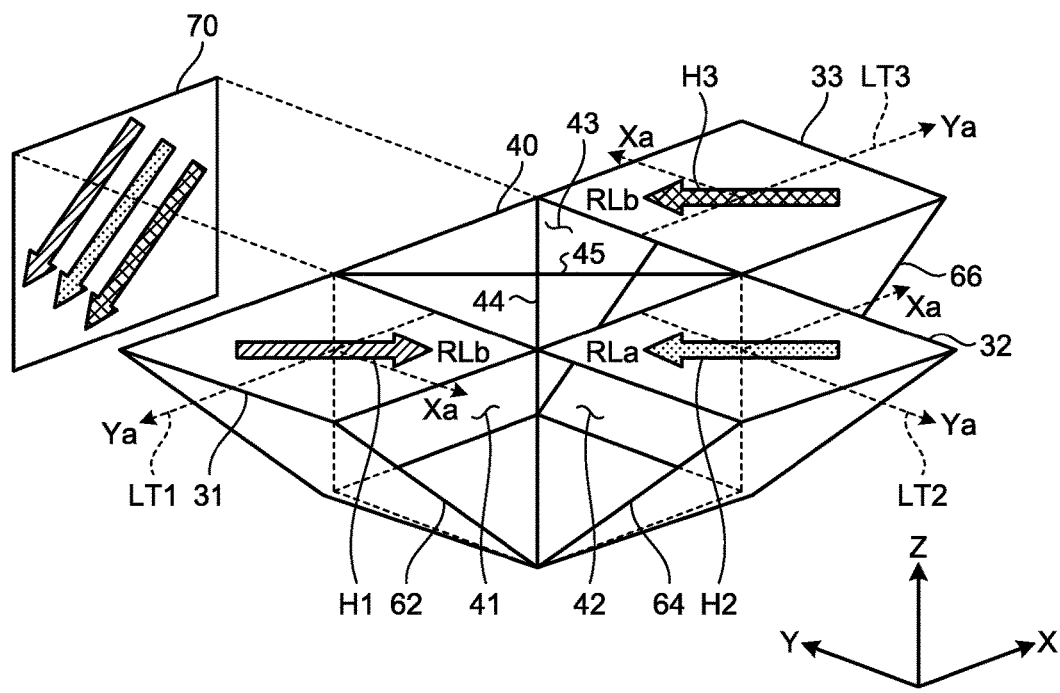
FIG. 12 is a plan view for describing action of the projection display device according to the present embodiment.

Incidentally, a relationship among the alignment direction H1 of the liquid crystal 36A of the first reflective liquid crystal panel 31, the alignment direction H2 of the liquid crystal 36A of the second reflective liquid crystal panel 32, and the alignment direction H3 of the liquid crystal 36A of the third reflective liquid crystal panel 33 may be given as illustrated in FIG. 12. Even in the example illustrated in FIG. 12, the alignment directions H1, H2, and H3 of the liquid crystal 36A of the first, second, and third reflective liquid crystal panels 31, 32, and 33 are set to each direction which is parallel to the diagonal of each pixel of the first, second, and third reflective liquid crystal panels 31, 32, and 33 and approaches the combining optical system 40. In the example illustrated in FIG. 12, the alignment direction H1 of the liquid crystal 36A of the first reflective liquid crystal panel 31 corresponds to the vector RLb between the vectors RLa and RLb that have been described with reference to FIG. 8. The alignment direction H2 of the liquid crystal 36A of the second reflective liquid crystal panel 32 corresponds to the vector RLa between the vectors RLa and RLb that have been described with reference to FIG. 8. The alignment direction H3 of the liquid crystal 36A of the third reflective liquid crystal panel 33 corresponds to the vector RLb between the vectors RLa and RLb that have been described with reference to FIG. 8. Even in the example illustrated in FIG. 12, the alignment direction H1 of the liquid crystal 36A of the first reflective liquid crystal panel 31 and the alignment direction H3 of the liquid crystal 36A of the third reflective liquid crystal panel 33 are orthogonal to the alignment direction H2 of the liquid crystal 36A of the second reflective liquid crystal panel 32. The alignment direction H1 of the liquid crystal 36A of the first reflective liquid crystal panel 31, the alignment direction H2 of the liquid crystal 36A of the second reflective liquid crystal panel 32, and the alignment direction H3 of the liquid crystal 36A of the third reflective liquid crystal panel 33 match each other in the image projected onto the screen 70 via the combining optical system 40 and the projection optical system 50.

As described above, the alignment direction of the liquid crystal 36A is parallel to the diagonal of the pixel in each of the first reflective liquid crystal panel 31, the second reflective liquid crystal panel 32, and the third reflective liquid crystal panel 33 according to the present embodiment. Accordingly, it is possible to obtain higher contrast in the image projected onto the screen 70 by the projection optical system 50.

In addition, when the first color light Lb which has been emitted from the first reflective liquid crystal panel 31 and reflected by the polarizer 62 is incident to the combining optical system 40 from the first incident surface 41, the second color light Lg which has been emitted from the second reflective liquid crystal panel 32 and reflected by the polarizer 64 is incident to the combining optical system 40 from the second incident surface 42, the first color light Lb is reflected by the first combining surface 44, and the second color light Lg passes through the first combining surface 44, the alignment direction H1 of the liquid crystal 36A of the first reflective liquid crystal panel 31 is orthogonal to the alignment direction H2 of the liquid crystal 36A of the second reflective liquid crystal panel 32 in the present embodiment. Thus, the alignment direction H1 of the liquid crystal 36A of the first reflective liquid crystal panel 31 and the alignment direction H2 of the liquid crystal 36A of the second reflective liquid crystal panel 32 match each other in an image projected onto the screen 70 via the combining optical system 40 and the projection optical system 50.

In addition, when the third color light Lr which has been emitted from the third reflective liquid crystal panel 33 and reflected by the polarizer 66 is incident to the combining optical system 40 from the third incident surface 43, the second color light Lg which has been emitted from the second reflective liquid crystal panel 32 and reflected by the polarizer 64 is incident to the combining optical system 40 from the second incident surface 42, the third color light Lr is reflected by the second combining surface 45, and the second color light Lg passes through the second combining surface 45, the alignment direction H3 of the liquid crystal 36A of the third reflective liquid crystal panel 33 is orthogonal to the alignment direction H2 of the liquid crystal 36A of the second reflective liquid crystal panel 32 in the present embodiment. Thus, the alignment direction H3 of the liquid crystal 36A of the third reflective liquid crystal panel 33 and the alignment direction H2 of the liquid crystal 36A of the second reflective liquid crystal panel 32 match each other in an image projected onto the screen 70 via the combining optical system 40 and the projection optical system 50.

Accordingly, it is possible to suppress the deterioration in image quality caused by differences in disclination generated in the plurality of reflective liquid crystal panels 31, 32, and 33. Thus, the projection display device 100 according to the present embodiment can prevent the deterioration in image quality caused by the disclination and display the high-contrast image.

According to an aspect of the present disclosure, provided is a projection display device which is capable of suppressing deterioration in image quality caused by disclination and displaying a high-contrast image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection display device comprising:
an illumination optical system that performs color separation of light emitted from a light source device to generate a plurality of color light;
reflective liquid crystal panels arranged in optical paths of the plurality of color light, respectively, to perform light modulation of the color light based on image data;
wire grid polarizers arranged in the optical paths of the plurality of color light, respectively, wherein the wire grid polarizers pass through the color light in a first polarization state and reflect the color light in a second polarization state;
a combining optical system that combines the plurality of color light, which are modulated by the reflective liquid crystal panels and are reflected by the wire grid polarizers, to generate combined light; and
a projection optical system that projects the combined light generated by the combining optical system onto a projection plane,
wherein
a reflective liquid crystal panel, of the reflective liquid crystal panels, comprises a liquid crystal layer comprising a liquid crystal that has a negative dielectric anisotropy, and is pre-tilted and aligned in an alignment direction that is parallel to a diagonal of a pixel of the reflective liquid crystal panel and approaches the combining optical system, the combining optical system comprises: a first incident surface to which first color light, which is emitted from a first reflective liquid crystal panel of the reflective liquid crystal panels and is reflected by a combining surface of the combining optical system, is incident; and a second incident surface to which second color light, which is emitted from a second reflective liquid crystal panel of the reflective liquid crystal panels and passes through the combining surface, is incident, the wire grid polarizers comprise: a first polarizer that passes through the first color light in the first polarization state; a second polarizer inclined to an optical path of the first color light transmitted through the first polarizer, wherein the second polarizer passes through the first color light in the first polarization state and reflects the first color light in the second polarization state from the first reflective liquid crystal panel to the first incident surface; a third polarizer that passes through the second color light in the first polarization state; and a fourth polarizer inclined to an optical path of the second color light transmitted through the third polarizer, wherein the fourth polarizer passes through the second color light in the first polarization state and reflects the second color light in the second polarization state from the second reflective liquid crystal panel to the second incident surface, and an alignment direction of a first liquid crystal of the first reflective liquid crystal panel is orthogonal to an alignment direction of a second liquid crystal of the second reflective liquid crystal panel.

2. The projection display device according to claim 1, wherein
the combining optical system comprises a third incident surface to which third color light, which is emitted from a third reflective liquid crystal panel of the reflective liquid crystal panels and is reflected by the combining surface of the combining optical system, is incident,
the wire grid polarizers comprise a fifth polarizer inclined to an optical path of the third color light, wherein the fifth polarizer passes through the third color light in the first polarization state and reflects the third color light in the second polarization state from the third reflective liquid crystal panel to the third incident surface,
the combining surface of the combining optical system comprises a first combining surface configured to combine the first color light and the second color light, and a second combining surface configured to combine the second color light and the third color light, and
the alignment direction of the first liquid crystal of the first reflective liquid crystal panel and an alignment direction of a third liquid crystal of the third reflective liquid crystal panel are orthogonal to the alignment direction of the second liquid crystal of the second reflective liquid crystal panel.

3. The projection display device according to claim 2, wherein
a first space having a triangular prism shape is formed by an incident surface of the first reflective liquid crystal panel to which the first color light in the first polarization state is incident, a reflective surface of the second polarizer to which the first color light in the second polarization state from the first reflective liquid crystal panel is incident, and the first incident surface of the combining optical system, a second space having a triangular prism shape is formed by an incident surface of the second reflective liquid crystal panel to which the second color light in the first polarization state is incident, a reflective surface of the fourth polarizer to which the second color light in the second polarization state from the second reflective liquid crystal panel is incident, and the second incident surface of the combining optical system, a third space having a triangular prism shape is formed by an incident surface of the third reflective liquid crystal panel to which the third color light in the first polarization state is incident, a reflective surface of the fifth polarizer to which the third color light in the second polarization state from the third reflective liquid crystal panel is incident, and the third incident surface of the combining optical system, the incident surface of the first reflective liquid crystal panel, the incident surface of the second reflective liquid crystal panel, and the incident surface of the third reflective liquid crystal panel face a same direction, and are arranged in a same plane that is parallel to a predetermined plane, with respect to the first combining surface, the alignment direction of the first liquid crystal of the first reflective liquid crystal panel and the alignment direction of the second liquid crystal of the second reflective liquid crystal panel are mirror-symmetric to each other, first image data of the first reflective liquid crystal panel and second image data of the second reflective liquid crystal panel are mirror-symmetric to each other, the reflective surface of the second polarizer and the reflective surface of the fourth polarizer are mirror-symmetric to each other, and the first incident surface and the second incident surface of the combining optical system are mirror-symmetric to each other, and with respect to the second combining surface, the alignment direction of the second liquid crystal of the second reflective liquid crystal panel and the alignment direction of the third liquid crystal of the third reflective liquid crystal panel are mirror-symmetric to each other, the second image data of the second reflective liquid crystal panel and third image data of the third reflective liquid crystal panel are mirror-symmetric to each other, the reflective surface of the fourth polarizer and the reflective surface of the fifth polarizer are mirror-symmetric to each other, and the second incident surface and the third incident surface of the combining optical system are mirror-symmetric to each other.

* * * * *